US012744635B2

(12) United States Patent
Zhang et al.

(10) Patent No.: US 12,744,635 B2
(45) Date of Patent: Sep. 22, 2026

(54) SYSTEMS AND METHODS FOR REFERENCE SIGNALING DESIGN AND CONFIGURATION

(71) Applicant: ZTE CORPORATION, Guangdong (CN)

(72) Inventors: Shujuan Zhang, Shenzhen (CN); Yijian Chen, Shenzhen (CN); Zhen He, Shenzhen (CN); Xinquan Ye, Shenzhen (CN); Zhaohua Lu, Shenzhen (CN); Shuqiang Xia, Shenzhen (CN); Guanghui Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 308 days.

(21) Appl. No.: 18/522,100

(22) Filed: Nov. 28, 2023

(65) Prior Publication Data

US 2024/0204941 A1 Jun. 20, 2024

Related U.S. Application Data

(63) Continuation of application No. PCT/CN2021/101733, filed on Jun. 23, 2021.

(51) Int. Cl.

| | |
|---|---|
| ***H04L 5/00*** | (2006.01) |
| ***H04W 72/232*** | (2023.01) |
| ***H04W 74/00*** | (2009.01) |

(52) U.S. Cl.

CPC .......... *H04L 5/0048* (2013.01); *H04L 5/0053* (2013.01); *H04W 72/232* (2023.01); *H04W 74/002* (2013.01)

(58) Field of Classification Search

CPC ... H04L 5/0048; H04L 5/0053; H04L 5/0007; H04L 5/0023; H04L 5/0051; H04W 72/232; H04W 74/002

See application file for complete search history.

(56) References Cited

U.S. PATENT DOCUMENTS

| | | | | |
|---|---|---|---|---|
| 12,375,980 | B2 * | 7/2025 | Zhang | H04W 36/0061 |
| 2019/0069256 | A1 * | 2/2019 | Jung | H04W 56/0015 |
| 2019/0268947 | A1 | 8/2019 | Zhang et al. | |

(Continued)

FOREIGN PATENT DOCUMENTS

| | | | |
|---|---|---|---|
| CN | 107682133 | A | 2/2018 |
| CN | 110831171 | A | 2/2020 |

(Continued)

OTHER PUBLICATIONS

Extended European Search Report for EP App. No. 21946374.2, dated Sep. 10, 2024 (10 pages).

(Continued)

*Primary Examiner* — Charles C Jiang
*Assistant Examiner* — Rachel Elizabeth Cerlanek
(74) *Attorney, Agent, or Firm* — Foley & Lardner LLP

(57) ABSTRACT

Presented are systems and methods for reference signaling design and configuration. A wireless communication device may determine X resources of synchronization signals (SS resources), wherein X is a positive integer value greater than 1. The wireless communication device may receive at least a portion of the X SS resources. The X SS resources may be associated with one element.

20 Claims, 16 Drawing Sheets

(56) References Cited

U.S. PATENT DOCUMENTS

2019/0364599 A1* 11/2019 Islam .................. H04W 74/004
2020/0068545 A1* 2/2020 Zhang ............... H04W 56/0015

FOREIGN PATENT DOCUMENTS

CN 110999429 A 4/2020
WO WO-2019/027180 A1 2/2019

OTHER PUBLICATIONS

International Search Report and Written Opinion for PCT Appl. No. PCT/CN2021/101733, mailed Mar. 23, 2022 (8 pages).
Examination Search Report on CA Appl. No. 3221717 dated Apr. 15, 2026 (6 pages).
Notice of Submission of Opinion on KR dated Appl. No. 10-2023-7040588 Mar. 30, 2026 (16 pages).
TS38.212 v16.5.0, "Multiplexing and channel coding," 3rd Generation Partnership Project; Technical Specification Group Radio Access Network; Release 16, Mar. 30, 2021 (152 pages).

* cited by examiner

800

1400

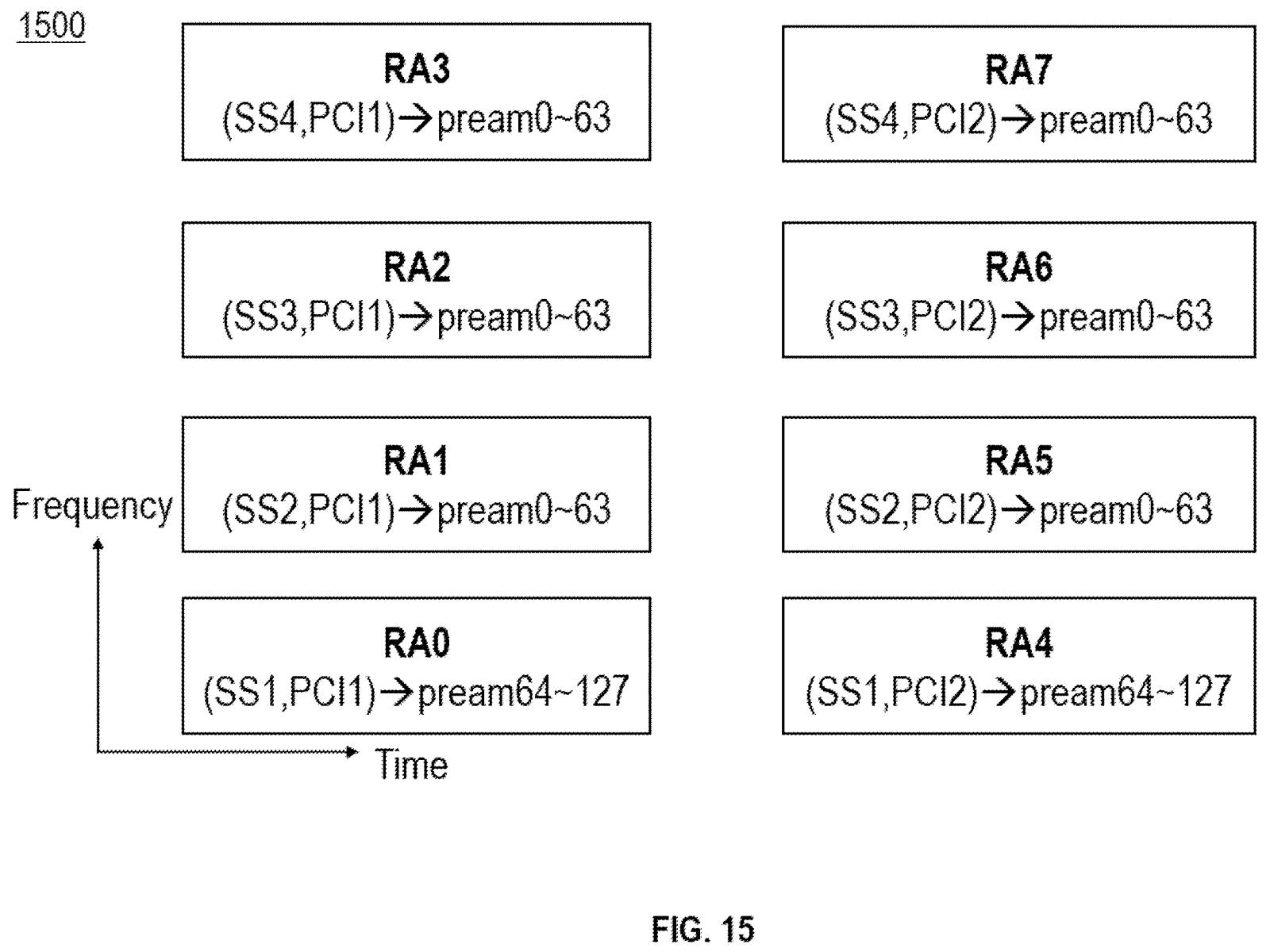

1500

RA3
(SS4,PCI1)→pream0~63

RA2
(SS3,PCI1)→pream0~63

RA1
(SS2,PCI1)→pream0~63

RA0
(SS1,PCI1)→pream64~127

RA7
(SS4,PCI2)→pream0~63

RA6
(SS3,PCI2)→pream0~63

RA5
(SS2,PCI2)→pream0~63

RA4
(SS1,PCI2)→pream64~127

Frequency

Time

FIG. 15

SYSTEMS AND METHODS FOR REFERENCE SIGNALING DESIGN AND CONFIGURATION

CROSS-REFERENCE TO RELATED APPLICATION

This application claims the benefit of priority under 35 U.S.C. § 120 as a continuation of PCT Patent Application No. PCT/CN2021/101733, filed on Jun. 23, 2021, the disclosure of which is incorporated herein by reference in its entirety.

TECHNICAL FIELD

The disclosure relates generally to wireless communications, including but not limited to systems and methods for reference signaling design and configuration.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may determine X resources of synchronization signals (SS resources), wherein X is a positive integer value greater than 1. The wireless communication device may receive at least a portion of the X SS resources. The X SS resources may be associated with one element.

In some embodiments, the one element may comprise one time-frequency occasion of SS resources and one physical cell index (PCI), the X SS resources occupy the one time-frequency occasion and correspond to the one PCI. In some embodiments, an SS sequence of each of the X SS resources may be determined according to the one PCI and an index of the corresponding SS resource. In some embodiments, the index of the corresponding SS resource may be an index of the corresponding SS resource among the X SS resources. In some embodiments, each of the X SS resources may correspond to a respective common control element. In some embodiments, the common control element may comprise one of: one physical broadcast channel (PBCH) block, one monitoring occasion of control resource set (CORESET) 0, one system information block (SIB), or the CORESET 0. In some embodiments, a SS resource of the X SS resources may be identified according to the one PCI and an index of the SS resource among the X SS resources.

In some embodiments, the wireless communication device may determine numbering or indexing for a plurality of SS resources according to one of: an ascending order across each set of X SS resources in a corresponding time-frequency occasion, then according to an ascending order across time occasions of SS resources, an ascending order across each set of X SS resources in a corresponding time-frequency occasion, then according to an ascending order across frequency occasions in a same time resource, then according to an ascending order across time occasions of SS resources, or an ascending order across time occasions of SS resources, then according to an ascending order across each set of X SS resources in a corresponding time-frequency occasion. In some embodiments, the wireless communication device may obtain mapping relationship between physical random access channel (PRACH) resources and the plurality of SS resources based on indexes of the plurality of SS resources. The wireless communication device may report an index of a selected SS resource based on indexes of the plurality of SS resources.

In some embodiments, the X SS resources are associated with the one element may comprise at least one of: one demodulation reference signal (DMRS) port of the one element is quasi co-located with the X SS resources, information of the one element is determined according to at least one of: X, one SS resource among the X SS resources, or the X SS resources, information of the one element is same for the X SS resources, or information of the one element is determined according to a time domain index of a time-frequency occasion that includes the X SS resources.

In some embodiments, X may be a predefined value. In some embodiments, X may be determined according to at least one of: a physical cell index (PCI) of at least one of the X resources, information of the one element, a carrier frequency of an SS occasion of the X SS resources, a sub-carrier spacing (SCS) of the X SS resources, a PCI group including at least one of the X resources, a location of the SS occasion, or mapping relationship between multiple SS resources and multiple elements, wherein the one element is in the multiple elements.

In some embodiments, receiving at least a portion of the X SS resources may comprise receiving the X SS resources according to a signaling, wherein the signaling includes a bitmap. In some embodiments, the X SS resources may correspond to 1 bit in the bitmap, wherein the 1 bit indicates whether the X SS resources are transmitted by a wireless communication node. In some embodiments, the X SS resources may correspond to X bits in the bitmap, wherein each of the X bits indicates whether one SS resource of the X SS resources is transmitted by the wireless communication node. In some embodiments, an available resource of a downlink channel or signal may be determined according to transmitted SS resources. In some embodiments, a type of an orthogonal frequency division multiplexing (OFDM) symbol may be determined according to the transmitted SS resources, wherein the type comprises downlink, uplink or flexible. In some embodiments, mapping relationship between physical random access channel (PRACH) resources and the transmitted SS resources may be determined. In some embodiments, the transmitted SS resources of the X resources may be received.

In some embodiments, the X SS resources are associated with the one element may comprise one DMRS port of the one element is associated with the X SS resources. In some embodiments, the X SS resources are associated with the one element may comprise each DMRS port of one DMRS port group of the one element is associated with the X SS resources. In some embodiments, information of the one DMRS port or the each DMRS port may be determined according to the X SS resources. In some embodiments, the information of the one DMRS port or the each DMRS port may include at least one of: quasi co-location reference signal (QCL-RS) of the one DMRS port or the each DMRS port, a sequence of the one DMRS port or the each DMRS port, or a resource element (RE) occupied by the one DMRS port or the each DMRS port. In some embodiments, the X SS resources may correspond to L physical cell indexes (PCIs), wherein L is an integer value greater than 1. In some embodiments, L may be smaller than or equal to X. In some embodiments, each of the X SS resources may correspond to one PCI of the L PCIs. In some embodiments, a sequence or information of the one element may be determined according to at least one of: the L PCIs, one PCI with predefined feature among the L PCIs, L, a value equal to 4, Y, wherein Y is a number of demodulation reference signal (DMRS) patterns of the one element, M, wherein M is a maximum number of candidate time SS occasions in a frame, a PCI group index, wherein the PCI group includes the L PCIs, or $\lfloor PCI/L \rfloor$, wherein the PCI is one PCI of the L PCIs, wherein the sequence includes at least one of: a scrambling sequence of a physical downlink channel, or a sequence of a signal.

In some embodiments, a sequence or information of the one element may be same for the L PCIs. In some embodiments, the L PCIs may correspond to one physical layer cell index to generate the sequence or the information of the one element. In some embodiments, the sequence may include at least one of: a scrambling sequence of a physical downlink channel, or a sequence of a signal. In some embodiments, the X SS resources may satisfy one of: the X SS resources are in one time-frequency occasion of SS resources, the X SS resources are in a same time occasion of SS resources, and are in more than one frequency occasion of SS resources, or the X SS resources are in more than one time occasion of SS resources. In some embodiments, the L PCIs may include a PCI set of {PCI=4n+a, n=x*L, x*L+1, . . . , x*L+L−1}, wherein a is one value from {0, 1, 2, 3} and x is an integer value equal to or larger than 0. In some embodiments, physical random access channel (PRACH) resources of each of the L PCIs may be determined according to a first signaling. In some embodiments, the X SS resources are associated with one element may comprise: the X SS resources correspond to the L PCIs and one serving cell, wherein the one element comprises the one serving cell, wherein L is smaller than X or equal to X. In some embodiments, the method may further comprise determining physical random access channel (PRACH) resources of each of the L PCIs, or determining PRACH resources according to a PCI of the L PCIs and an SS resource index. In some embodiments, the PRACH resources of each of the L PCIs may be determined according to a first signaling.

In some embodiments, physical random access channel (PRACH) resources of each of the X SS resources may be determined by a first signaling.

In some embodiments, the first signaling may comprise one of: a respective PRACH configuration for each of the X SS resources, a PRACH configuration for the X SS resources, a first type of PRACH parameter configuration for the X SS resources and a second type of PRACH parameter configuration for each of the X SS resources, a respective PRACH configuration for each of the L PCIs, a PRACH configuration for the L PCIs, or a first type of PRACH parameter configuration for the L PCIs and a second type of PRACH parameter configuration for each of the L PCIs. In some embodiments, the first signaling may be a system information block 1 (SIB1). In some embodiments, the first signaling may be a single signaling. In some embodiments, the PRACH configuration may comprise a configuration of at least one of: time resource of PRACH occasions, frequency resource of PRACH occasions, preambles for one PCI, preambles for one SS resource, number of preambles for one SS resource, number of preambles for each of the X SS resources, or number of SS resources associated with one PRACH occasion, number of SS resources which are in an SS occasion and are associated with one PRACH occasion, or number of PCIs associated with one PRACH occasion. In some embodiments, the first type of PRACH parameter configuration may comprise a configuration of at least one of: time resource of PRACH occasions, frequency resource of PRACH occasions, number of preambles for one SS resources, number of preamble for each of the X SS resources, or number of SS resources associated with one PRACH occasion.

In some embodiments, the X SS resources may be associated with a same index of SS resource. In some embodiments, the one element may comprise one common control element. In some embodiments, the information of the one element may comprise at least one of: a bit carried on the one element before channel code, a scramble sequence added to a cyclic redundancy code (CRC) of the one element, a scramble sequence added to bits of the one element after the channel code, a sequence of a demodulation reference signal (DMRS) of the one element, a quasi co-location reference signal (QCL-RS) of the DMRS of the one element, a resource element (RE) occupied by the DMRS of the one element, or a resource occupied by the one element. In some embodiments, the wireless communication device may perform based on the X SS resources, one of: cell search, measurement, or receiving the one element. In some embodiments, performing the cell search may comprise one of: acquiring time and frequency synchronization with a physical layer cell and detecting a physical layer cell identifier (ID) of the physical layer cell, or acquiring time and frequency synchronization with a physical cell group and detecting a cell group ID of the cell group. In some embodiments, an SS resource of the X SS resources may comprise a synchronization signal and a time-frequency SS occasion, wherein the synchronization signal is received in the time-frequency SS occasion. In some embodiments, the synchronization signal may comprise at least one of: a primary synchronization signal (PSS), or a secondary synchronization signal (SSS).

In some embodiments, one physical cell index (PCI) may correspond to the X SS sequences. In some embodiments, the X SS resources may comprise X SS ports, and each of the X SS resource includes one SS port. In some embodiments, one PCI may correspond to the X SS resources in one time-frequency occasion of SS resource and the one element. In some embodiments, the X SS resources may be determined according to at least one of: a PCI of at least one of the X SS resources, information of the one element, a carrier frequency of an occasion of the X SS resources, a sub-carrier spacing (SCS) of the X SS resources, a PCI group including at least one of the X SS resources, or a location of the SS occasion index of a SS resource, or mapping relationship between multiple SS resources and multiple elements, wherein the one element is in the multiple elements. In some embodiments, the one element may comprise at least one of: one physical broadcast channel (PRCH) block, control resource set (CORESET) 0, one system information block (SIB), one serving cell, one physical cell index (PCI), one occasion of SS resources, one monitoring occasion of one common control channel, or one PRACH configuration. In some embodiments, a second signaling that provides information of a PRACH resource may include an index of a reference signal resource associated with the PRACH resource, and at least one of following information: a PCI, frequency location of a SS resource, or subcarrier spacing of the SS resource, wherein the reference signal resource comprises the SS resource or a channel state information reference signal (CSI-RS) resource. In some embodiments, the second signaling may include physical downlink control information. In some embodiments, the CSI-RS resource is quasi co-located (QCL-ed) with the SS resource.

At least one aspect is directed to a system, method, apparatus, or a computer-readable medium. A wireless communication node may determine X resources of synchronization signals (SS resources), wherein X is a positive integer value greater than 1. The wireless communication node may transmit at least a portion of the X SS resources. The X SS resources may be associated with one element.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 15 illustrates the SS resources of L PCIs numbered together and mapped in order to PRACH resources, in accordance with some embodiments of the present disclosure;

DETAILED DESCRIPTION

1. Mobile Communication Technology and Environment

Figure 1:
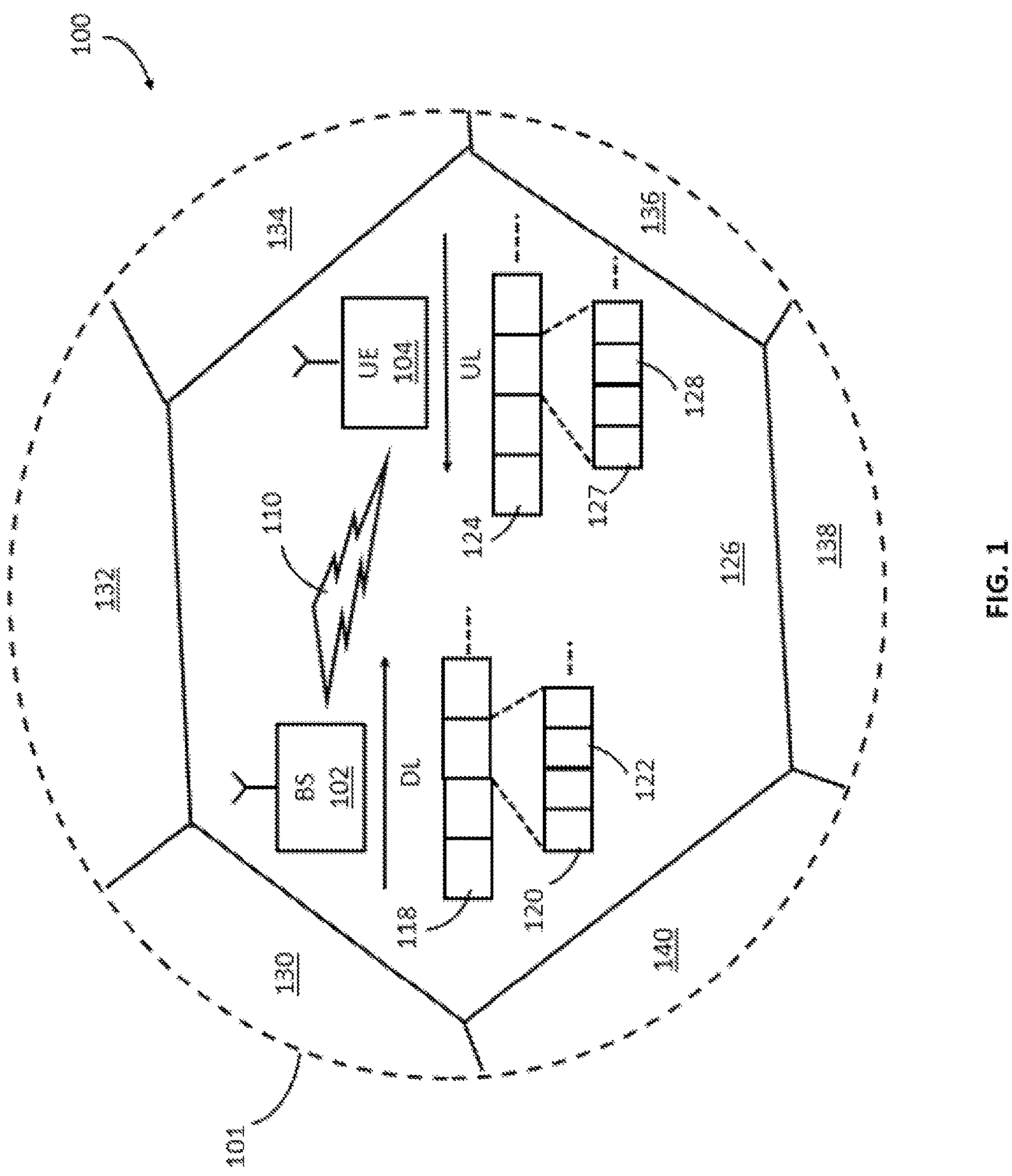
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
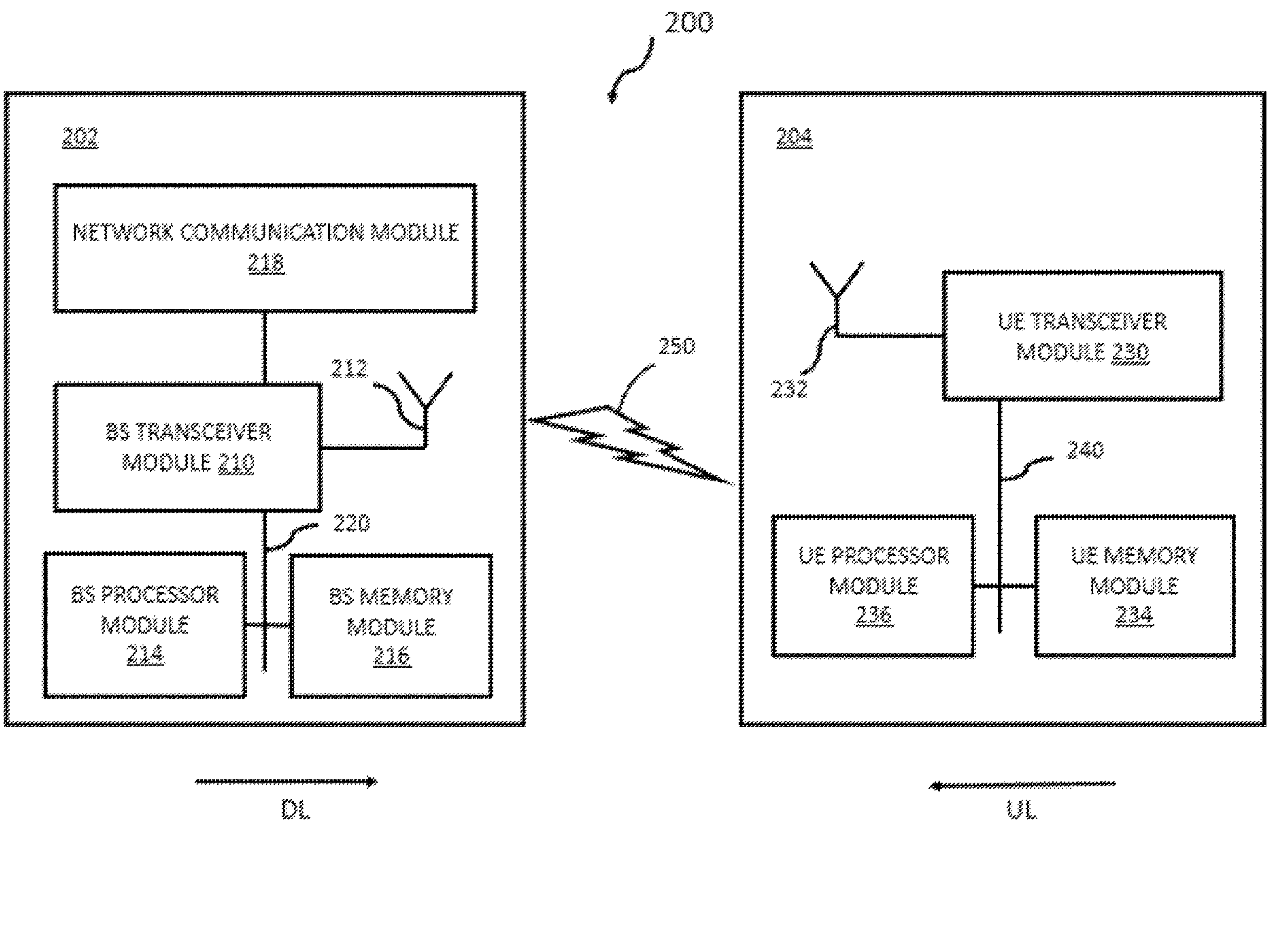
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Reference Signaling Design and Configuration

Certain resources, such as a physical random access channel (PRACH) resource and/or other resources, may be associated and/or related with an access point (AP) and/or a beam. A wireless communication device (e.g., a UE, a terminal, or a served node) may identify and/or determine a particular AP and/or beam (e.g., associated to a PRACH resource, or associated with one SS resource).

In certain cells, such as a central cell, one or more antennas (e.g., all antennas) of the cell may be located in a same place. In a distributed cell, a plurality of wireless communication nodes (e.g., a ground terminal, a base station, a gNB, an eNB, a transmission-reception point (TRP), an AP, an antenna point, and/or a serving node) can be located in different, separate, and/or distinct locations. The plurality of wireless communication nodes (e.g., APs) may serve one or more wireless communication devices (e.g., UEs) simultaneously/concurrently. In some embodiments, the transmission power of the one or more antennas of the central cell may satisfy and/or meet certain restrictions. For example, due to safety concerns, the total/accumulated/added power of the one or more antennas may be lower than a threshold. However, the plurality of wireless communication nodes (e.g., APs) of a distributed cell may not need to satisfy/meet the restrictions of the central cell. In a distributed cell, separate/distinct/different wireless communication devices (e.g., UEs) may be served by separate and/or different sets of wireless communication nodes or APs (e.g., AP sets). A particular cell, such as virtual cell specific to a wireless communication device (e.g., UE-specific virtual cell formed by an AP set), can be configured/identified (e.g., by a set of wireless communication nodes). As such, a distributed cell may have different characteristics and/or demands compared with a central cell.

The systems and methods presented herein include a novel approach for identifying (e.g., by a wireless communication device) a plurality of wireless communication nodes, determining which of the plurality of wireless communication nodes serve the wireless communication device, and/or configuring a set of wireless communication nodes (e.g., AP set) for the wireless communication device, according to corresponding synchronization signal resources (SS resources), and/or a relationship between the SS resources and one element (such as a physical broadcast channel (PBCH)). In some embodiments, a central cell may adopt beam transmission. If the cell adopts beam transmission, the cell can transmit, send, and/or broadcast one or more beams simultaneously. The systems and methods described herein can include a novel approach for accelerating a scan of the one or more beams by the wireless communication device (e.g., UE) and for identifying its best beam, for instance via knowledge of and/or focusing on the specific SS resources.

Figure 3:
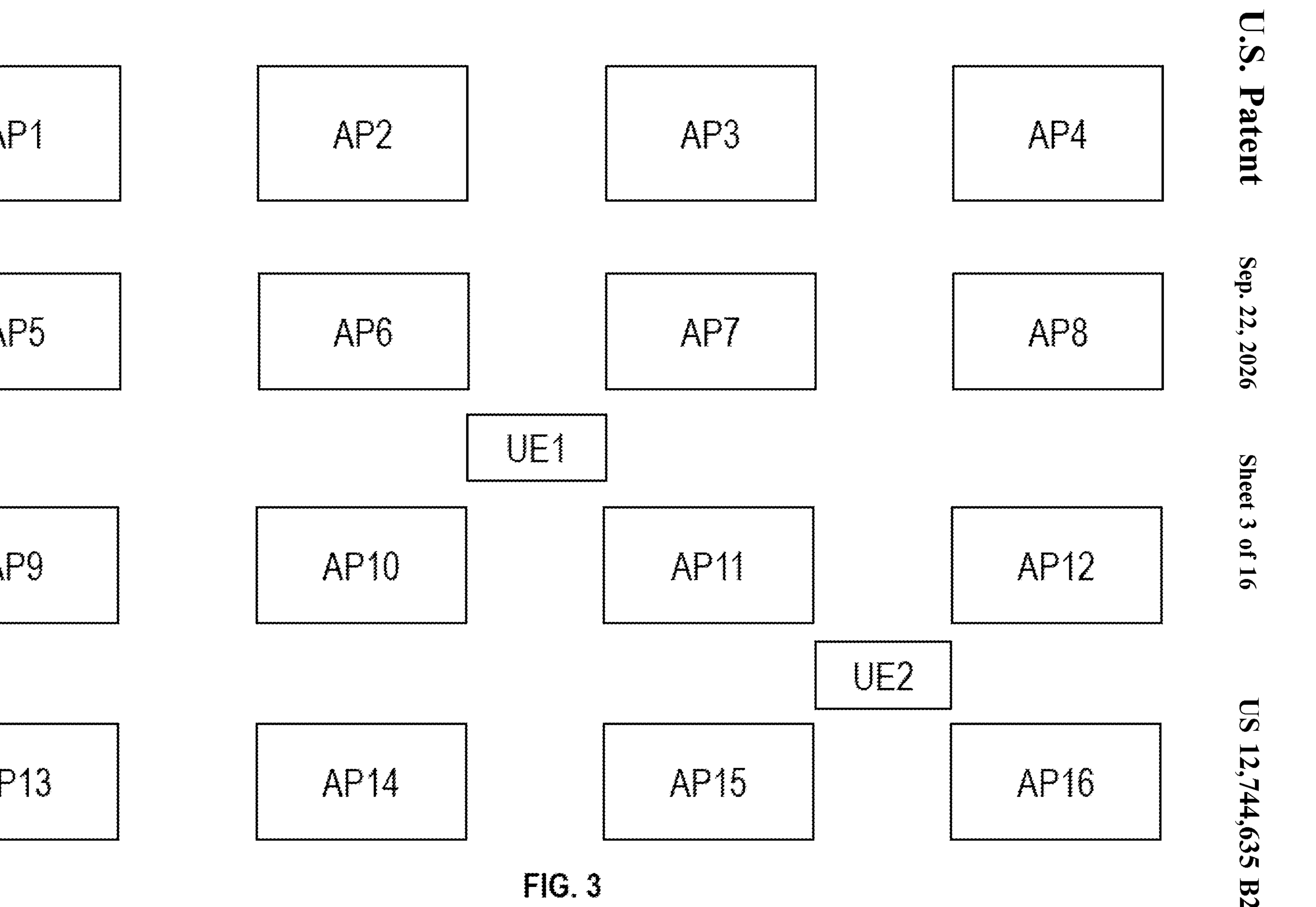
FIG. 3 illustrates an example system with one or more wireless communication nodes and/or one or more wireless communication devices, in accordance with some embodiments of the present disclosure.

Referring now to FIG. 3, depicted is a block diagram of one example embodiment of a system 300 with one or more wireless communication nodes (e.g., APs) and/or one or more wireless communication devices (e.g., UEs). The system 300 includes Z (e.g., Z=16 and/or other numbers) wireless communication nodes that serve K (e.g., K=2 and/or other numbers) wireless communication devices. A wireless communication device (or gNB) may select, determine, and/or identify a set of wireless communication nodes (e.g., AP set) for each wireless communication device from the Z wireless communication nodes. The wireless communication device may be served by the identified set of wireless communication nodes. A virtual cell specific to the wireless communication device (e.g., UE-specific virtual cell) corresponding to the identified set of wireless communication nodes can be established, generated, and/or configured. As such, interference between the wireless communication nodes for the wireless communication device can be reduced, and therefore, the wireless communication device may experience a same/similar communication quality everywhere. In order to establish such a set of wireless communication nodes specific to the wireless communication device (e.g., a UE-Specific AP set), the following method is proposed.

A. Example 1

Figures 4, 5:
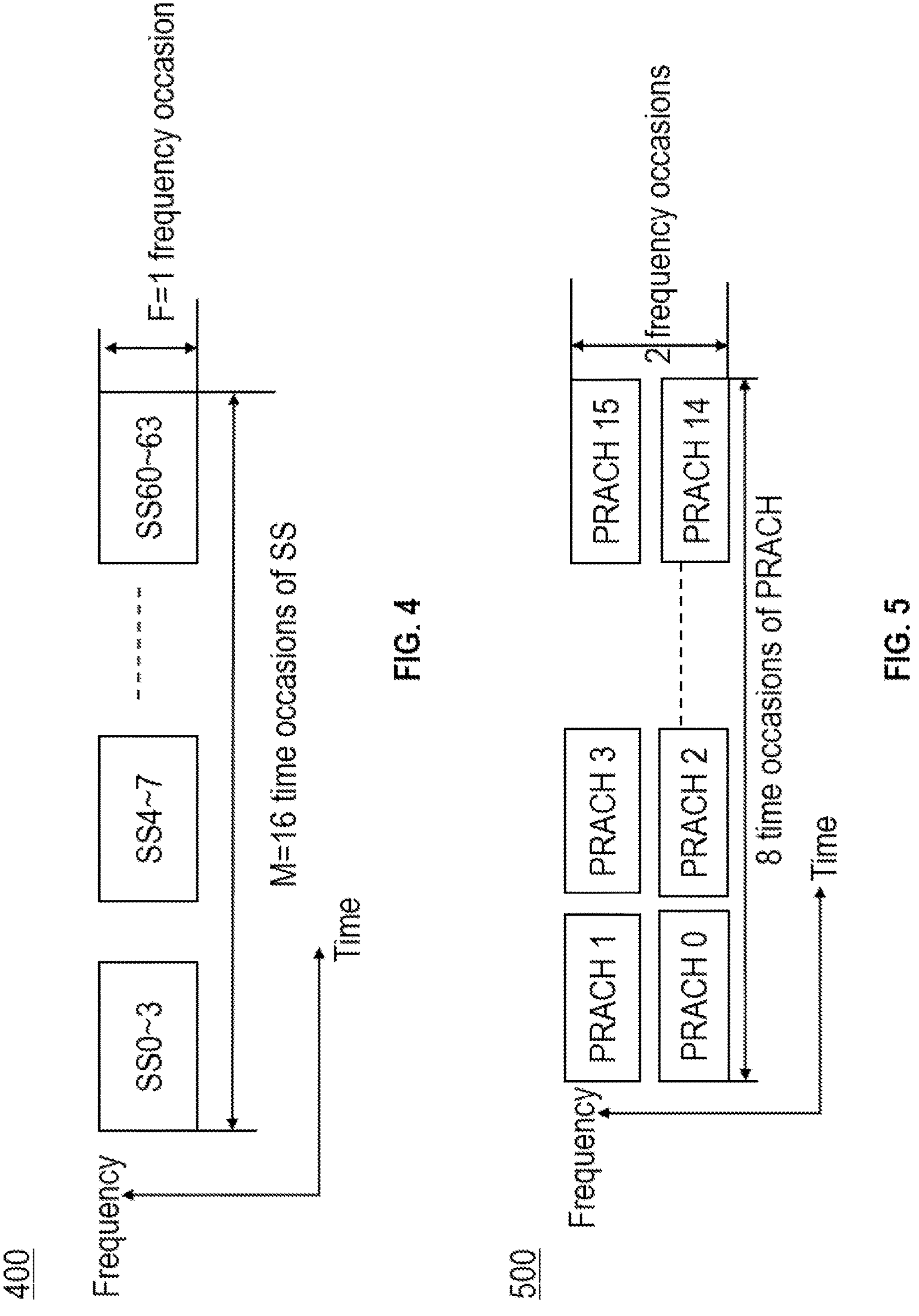
FIG. 4 illustrates N SS resources in one SS occasion for one PCI, in accordance with some embodiments of the present disclosure.
FIG. 5 illustrates 16 PRACH occasions mapped to a plurality of SS resources, in accordance with some embodiments of the present disclosure.

For one (or some other number of) physical cell index (PCI), there can be N synchronization signal (SS) resources occupying a same time-frequency SS occasion, as shown in FIG. 4. The value of N can be larger than 1 (or other numbers). In one example, N can correspond to a value of 4, (e.g., SS0~3) and/or N may be smaller than or equal to X. The X SS resources can include the N SS resources. In the embodiments described herein, one time-frequency SS occasion can be described as (or referred to) as one SS occasion (e.g., a time frequency occasion of the SS resource). As shown in FIG. 4, each of the N SS resources may share a same occasion. For example, N SS resources with indexes {N*i, N*i+1, N*i+2, . . . , N*i+N−1} may share a same time-frequency SS occasion, wherein i=0, 1, . . . , M−1. The value of M can indicate and/or specify a maximum number of candidate SS time occasions. One (or some other number of) SS resource may correspond to one SS occasion and/or one SS signal. In some embodiments, the SS signal may include or correspond to a primary synchronization signal (PSS) and/or a secondary synchronization signal (SSS). One SS resource may include or correspond to one SS block (and/or other terms). The N SS resources in a same SS occasion may include or correspond to N SS sequences. If the SS sequence of a SS resource is transmitted/received, the SS sequence may occupy the time and frequency location of the SS resource. The N sequences may correspond to a same PCI. One sequence may include or correspond to a sequence of a PSS and/or a sequence of a SSS. The wireless communication device may be unable to assume a quasi-co-location (QCL) relationship between the N SS resources.

In some embodiments, the N (e.g., X) can be predefined and/or determined. The N can be determined according to (or based on) at least one of: a PCI, information associated with a physical broadcast channel (PBCH), a carrier frequency of the SS occasion, a sub-carrier space (SCS) of the SS, a PCI group, and/or a location of the SS occasion. If the N is determined according to the information associated with the PBCH (e.g., the one element), the information of the PBCH (e.g., PBCH block) may be determined according to (or by using) the N. The information of the PBCH may include or correspond to at least one of: one or more bits carried in the PBCH before a channel code, a scramble sequence added to a cyclic redundancy check (CRC) of the PBCH, a scramble sequence added to the PBCH bit-sequence after the channel code, a QCL reference signal (QCL-RS) of a demodulation reference signal (DMRS) of the PBCH, the sequence of the DMRS of the PBCH, the resource element (RE) occupied by the DMRS of the one PBCH block, and/or the resource element occupied by the PBCH. For example, the N may be carried and/or specified in at least one bit of the PBCH before the channel code. The scramble sequence added to the CRC of the PBCH may be determined according to the N. The sequence of the DMRS of the PBCH and/or the scrambling sequence added to the PBCH bit-sequence after the channel code may be determined/obtained according to (or based on) the N. In some embodiments, the N (e.g., X) may be determined by (or according to) the PCI group. If the N is determined by the PCI group, the PCIs may be divided, separated, and/or categorized into a plurality of groups. Each PCI group can be associated with (or related to) a value of N. In some embodiments, the N may be determined according to the location of the SS occasion. If N is determined by the location of the SS occasion, the SS occasion can be divided into a plurality of groups. Each group of the SS occasion may be associated with a value of N.

In some embodiments, the DMRS of the PBCH block may include or correspond to a pseudo-random sequence generated by an initialized value of $$c_{init} = 2^{11}(\bar{\imath}_{SSB}+1)\left(\left\lfloor \frac{N_{ID}^{cell}}{4} \right\rfloor + 1\right) + 2^{6}(\bar{\imath}_{SSB}+1) + 2^{x}(f(N)) + \left(N_{ID}^{cell} \bmod 4\right),$$

where for $\bar{L}_{max}=4$, $\bar{\imath}_{SSB}=i_{SSB}+4n_{hf}$. The parameter $n_{hf}$ may indicate the number of the half-frame in which the PBCH is transmitted in a frame. In some embodiments, $n_{hf}=0$ for the first half-frame in the frame, and/or $n_{hf}=1$ for the second half-frame in the frame. The parameter $i_{SSB}$ may specify/indicate the two least significant bits of the candidate SS resource index. In some embodiments, $i_{SSB}$ may indicate and/or specify the two least significant bits of the candidate SS time occasion index. For $\bar{L}_{max}>4$, $\bar{\imath}_{SSB}=i_{SSB}$, where $i_{SSB}$ can indicate the three least significant bits of the candidate SS resource index. The value of $\bar{L}_{max}$ may indicate and/or specify the maximum number of candidate SS resources of one PCI in a half frame. In some embodiments, $i_{SSB}$ may specify the three least significant bits of the candidate SS time occasion index. The parameter $\bar{L}_{max}$ may specify the maximum number of candidate SS time occasions in a half frame. In some embodiments, f(N) may be a function of N. For example, f(N) may indicate the index of N in a set of all the values of N, such as {1, 2, 4, 8, 16, 32, 64}. For example, if N is 1, then f(N) can be 0. In another example, if N is 32, f(N) can be 5 and/or $f(N)=\lceil \log_2 N \rceil$. In some embodiments, x may be a predefined value of the set {2, 3, 4, 5}. In some embodiments, the DMRS of the PBCH may be a pseudo-random sequence generated by an initialized value of $$c_{init} = 2^{11}(\bar{\imath}_{SSB}+1)\left(\left\lfloor \frac{N_{ID}^{cell}}{4} \right\rfloor + 1\right) + 2^{y}(f(N)) + 2^{2}(\bar{\imath}_{SSB}+1) + \left(N_{ID}^{cell} \bmod 4\right).$$

The parameter y may be a predefined value of the set of {6, 7, 8, 9, 10}.

In some embodiments, the wireless communication device can assume a default value of N before receiving a configuration of the N. For example, the wireless communication device may assume the default value of N corresponds to 4, and/or the default value of N is 1.

In some embodiments, N SS resources in a same SS occasion may be transmitted by using N signals. Each of the N signals can include or correspond to a PSS and/or a SSS. The N signals may correspond to a same PCI. For example, the sequence of the SS (for example, PSS and/or SSS) may be generated according to (or based on) the PCI and/or at least one of: the SS index and/or location of SS occasion The SS index may include or correspond to the absolute SS index among all SS resource indices across a plurality of SS occasions corresponding to the same PCI. In some embodiments, the SS index may be a local SS index among the N SS in a same occasion corresponding to the same PCI. If the SS index is used to obtain the sequence of the SS signal, the sequences of N SS resources in different/distinct SS occasions can be the same for one PCI. For example, as shown in FIG. 4, the sequences of SS resource 0~3 in occasion 0 may correspond to (e.g., be the same as) the sequences of SS resources 4~7 in occasion 1. The sequences of SS resource 4n may be the same across different SS occasions. The sequences of SS resource 4n+1 may be the same across different SS occasions. The sequences of SS resource 4n+2 may be the same across different SS occasions. The sequences of SS resource 4n+3 may be the same across different SS occasions. In some embodiments, the parameter n may have a value that is included in the set of {0~15}. The parameter n may indicate and/or specify an index of the SS occasion. For one PCI, there may be N sequences of SS signals across M SS occasions. In FIG. 4, for example, N=4. The N sequences may be repeatedly transmitted in M occasions. The same sequence in different occasions may correspond to different SS resources. In some embodiments, at least one of the PSS and/or SSS may be obtained and/or determined according to (or based on) the PCI and/or the SS resource index. In some embodiments, the PSS and/or SSS can be determined according to the PCI. For example, the PSS may be determined according to the PCI. In a same example, the SSS may be determined according to the PCI and/or the SS resource index. If the N is determined according to the location of the SS occasion, the SS locations may be divided into a plurality of groups. Each SS location group may be associated with one value of the N. The location of the SS occasion may include or correspond to the time location and/or frequency location of the SS occasion.

In order to obtain and/or determine a mapping relationship/association between at least one SS resource and a physical random access channel (PRACH) resource (and/or to identify a SS resource), one or more SS resources can be numbered and/or identified according to at least one of: Scheme 1 and/or Scheme 2.

- Scheme 1: The SS resources may be first indexed in an ascending order across the N SS resources in a same SS occasion. Subsequently, the SS resources may be indexed in an ascending order across the SS time occasion, as shown in FIG. 4.
- Scheme 2: The SS resources may be first indexed in an ascending order across the SS time occasion. Subsequently, the SS resources may be indexed in an ascending order across the N SS resources in a same SS occasion.

In some embodiments, the wireless communication device may report, specify, and/or indicate the selected SS index to the wireless communication node (e.g., gNB). During the PRACH process, the wireless communication device may report and/or specify the selected SS index by transmitting a PRACH resource selected from a PRACH resource group associated with the selected SS resources. Therefore, the wireless communication device may determine a mapping relationship between M*N SS resources and the PRACH resources. At least one PRACH resource may correspond to at least one time-frequency PRACH occasion and/or one preamble. The one preamble can be transmitted in (and/or via) the PRACH occasion. A same/corresponding preamble in different/distinct PRACH occasions may correspond to different PRACH resources. As shown in FIG. 5, there can be 16 (or other numbers) PRACH occasions, for example. At least one PRACH occasion may correspond to a plurality of preambles, such as 64 (or other values) preambles. Therefore in FIG. 5, there can be 16*64 PRACH resources. The PRACH resources can be grouped into a plurality of PRACH resource groups. Each PRACH resource group may correspond to at least one SS resource. The wireless communication node (e.g., gNB) may inform (and/or report) the wireless communication device of a number A of SS resources associated with at least one PRACH occasion. The M*N SS indexes can be mapped to the 64*16 PRACH occasions (in order). Each A SS index can be mapped to at least one PRACH occasion. The A SS indexes associated with a same PRACH occasion can correspond to A preamble groups. If the wireless communication device selects and/or identifies at least one SS resource, the wireless communication device may select a PRACH resource among PRACH resource group associated with the selected SS resource. The PRACH resources of each of the N SS resources may be obtained and/or determined according to (or based on) one PRACH configuration. The PRACH configuration may include at least one of: PRACH occasion information, preamble information, the number of SS resources corresponding to one PRACH occasion, and/or the number of preambles of one SS resource. The PRACH configuration may be configured in one system information block (SIB), such as SIB1. After PRACH, the wireless communication device accessing the cell, and/or during a radio resource control (RRC) connection stage, the wireless communication device may directly report the selected/identified/determined SS resource index (or indices) using channel state information (CSI) reporting. Therefore, the wireless communication device may use the SS resource to select a training beam between the wireless communication device and the wireless communication node (e.g., base station), and/or to obtain a set of wireless communication nodes specific to the wireless communication device (e.g., UE-Specific AP set). Because there is more than one SS resource in one SS occasion for one PCI, the wireless communication device can determine the training beam and/or the set of wireless communication nodes quickly.

As shown in FIG. 4, the number M of SS time occasions in a frame may be 16 (or other values). The wireless communication node (e.g., gNB) can indicate, communicate, and/or specify to the wireless communication device (e.g., UE) which SS occasions, among the M SS occasions, are transmitted by the wireless communication node using a bit map with M bits. If a bit corresponding to a SS occasion is 1, all N SS resources in the time occasion may be transmitted by the wireless communication node. In some embodiments, the wireless communication node may indicate which SS resource, among M*N SS resources, can be transmitted by the wireless communication node using a bit map with M*N bits. Therefore, the wireless communication node may transmit a part/portion of the N SS resources in a SS occasion. At least one value set to 1 in the bitmap can indicate that the SS resource corresponding to the bit is transmitted by the wireless communication node. The wireless communication device may obtain one or more available resources of a downlink channel/signal according to the transmitted SS resources. For example, the physical resource block (PRB) of the transmitted SS resource may not be available for the physical downlink shared channel (PDSCH), physical downlink control channel (PDCCH), and/or CSI reference signal (CSI-RS) at the orthogonal frequency-division multiplexing (OFDM) symbol of the transmitted SS resource. The wireless communication device may obtain/determine the type of the OFDM symbol of the transmitted SS resource. The type of the OFDM symbol may include downlink, uplink, and/or flexible. In one example, the OFDM symbol of the transmitted SS resource may be downlink. The wireless communication device may determine the mapping relationship between one or more SS resources transmitted by the wireless communication node and one or more PRACH resources. The SS resources with an indicated value of 1 in the bitmap can be mapped (e.g., in order) to 16*64 PRACH resources, as shown in FIG. 5. The SS resources with and indicated value of 0 may not be mapped to the 16*64 PRACH resources, as shown in FIG. 5. For example, 18 SS resources (or other numbers of SS resources) among the 64 SS resources may be transmitted by the wireless communication node. The 18 SS resources may be mapped (e.g., in order) to the 16*64 PRACH resources in FIG. 5.

Figures 6, 7:
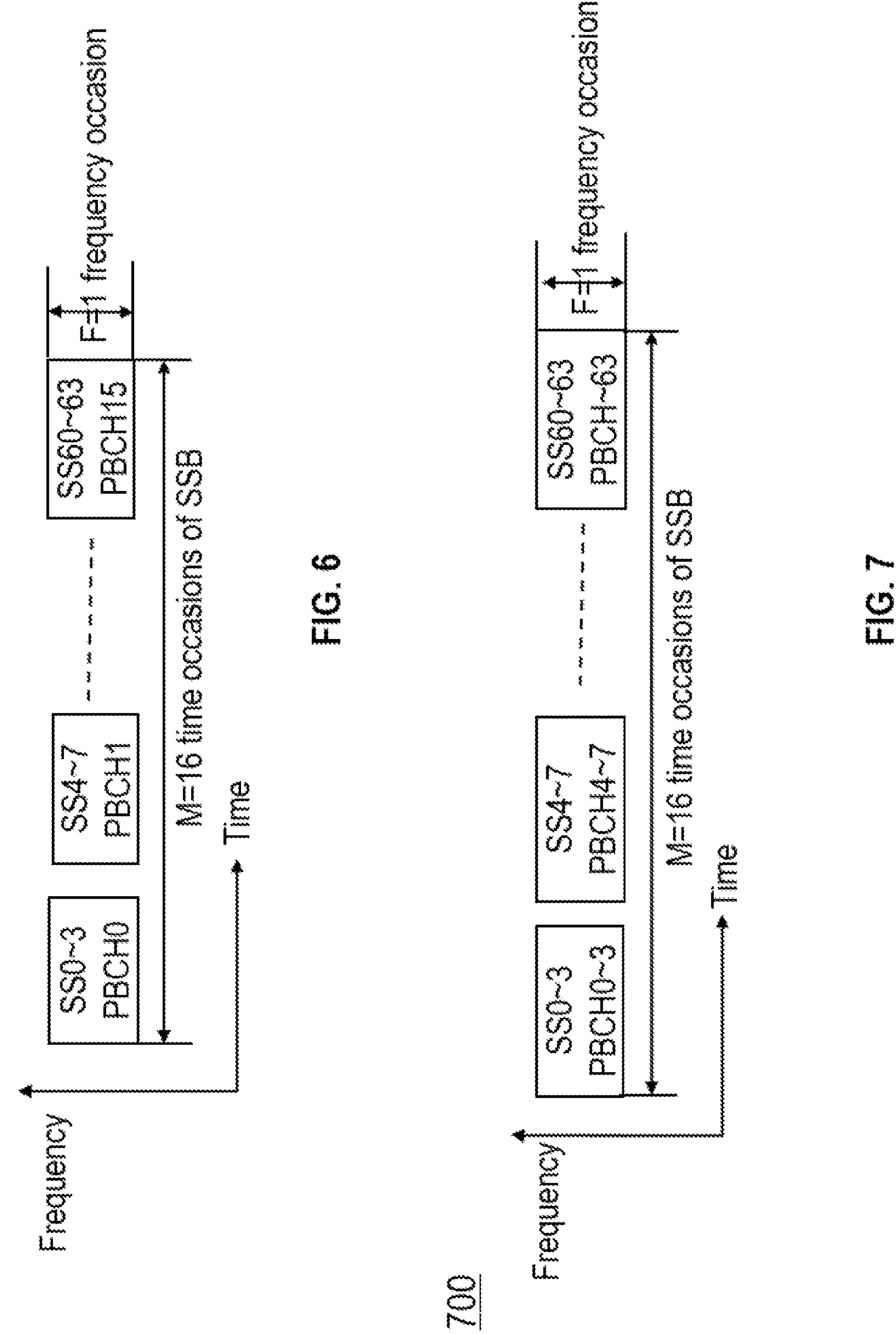
FIG. 6 illustrates N SS resources in one SS occasion for one PCI corresponding to one element (such as a PBCH block), in accordance with some embodiments of the present disclosure.
FIG. 7 illustrates each of the N SS resources in one SS occasion for one PCI corresponding to a respective common control element (such as a PBCH block), in accordance with some embodiments of the present disclosure.

In some embodiments, the N SS resources of a same SS occasion may correspond to (or be associated with) one same PBCH block (e.g., one element), as shown in FIG. 6. The DMRS port of the same PBCH can be QCL-ed with the N SS resources. The PBCH block may correspond to one time-frequency occasion. One or more PBCH blocks in different/separate time-frequency occasions may be different/distinct from each other, as shown in FIG. 6. In FIG. 6, for example, PBCH 1 and PBCH 2 can be different/distinct PBCH blocks. The information of the PBCH may be determined according to (or by using) at least one of the following methods.

Method 1: The information of the PBCH (PBCH block) may be determined according to a time domain index of the SS occasion including the N SS resources.

Method 2: The information of the PBCH (PBCH Block) may be determined according to the SS resource index and/or the N. For example, the information of the PBCH may be determined according to $\lfloor j_{SS}/N \rfloor$. The parameter $j_{SS}$ may be the index of the SS resource index. The M SS occasions may correspond to M monitoring occasions of CORESET0. Each of the M SS occasions may correspond to one monitoring occasion of the M CORESET0 occasion (e.g., one element). Furthermore, the information of the PBCH block may be obtained according to at least one of:

$$\mathrm{mod}\left(\left\lfloor \frac{j_{ss}}{N} \right\rfloor, B\right), \lfloor j_{ss}/(N*B) \rfloor,$$

the last C bits of $\lfloor j_{SS}/N \rfloor$, and/or some bits of $\lfloor j_{SS}/N \rfloor$. The parameter B may be an integer, such as 4 and/or 8. In some embodiments, the value of B may be smaller than or equal to the N. The time and/or frequency resource of a monitoring occasion of CORESET0 may be determined and/or obtained according to the SS resource index and/or the N. For example, the time and/or frequency resource of a monitoring occasion of CORESET0 occasion may be determined according to $\lfloor j_{SS}/N \rfloor$. At least one monitoring occasion of CORESET0 may correspond to the N SS resources. The DMRS port of the one monitoring occasion of CORESET0 can be QCL-ed with the N SS resources. In some embodiments, the SS resources may be numbered using Scheme 1.

Method 3: The information of the PBCH (PBCH block) can be determined according to the SS resource index and/or the maximum number M of candidate SS time occasions. For example, the information of the PBCH may be obtained according to $\mathrm{mod}(j_{SS}, M)$ and/or $\lfloor j_{SS}/M \rfloor$. The M SS occasions may correspond to M monitoring occasion of CORESET0. Each of the M SS occasions may correspond to one monitoring occasion of the M monitoring occasion of CORESET0. Furthermore, the information of the PBCH may be determined according to at least one of: $\mathrm{mod}(\mathrm{mod}(j_{SS}, M), B)$, $\lfloor \mathrm{mod}(j_{SS}, M)/B \rfloor$, the last C bits of $\mathrm{mod}(j_{SS}, M)$, and/or some bits of $\mathrm{mod}(j_{SS}, M)$. In some embodiments, the M may specify and/or indicate the maximum number of candidate SS time occasions in a half-frame. The B can be an integer. In some embodiments, the B may be smaller than or equal to the M. The time and/or frequency resource of one monitoring occasion of CORESET0 can be determined according to $\mathrm{mod}(j_{SS}, M)$. In some embodiments, the SS resources may be numbered according to Scheme 2.

In some embodiments, each of the N SS resources of a same SS occasion may correspond to a respective PBCH block, as shown in FIG. 7. The N PBCH blocks corresponding to the N SS resources can be in different PBCH occasions, and/or in a same PBCH occasion, as shown in FIG. 7. If the N PBCH blocks are in a same PBCH occasion, the DMRS of the N PBCH blocks may be different, and therefore, can be distinguished. For example, the N DMRS of the N PBCH blocks may be in different REs. In some embodiments, the sequences of N DMRS of the N PBCH blocks can be different and/or in same REs. The sequence of each DMRS of the N DMRS may be determined according to the SS resource index. The N SS resources may have different SS resource indexes.

In FIGS. 6 and 7, the SS resource and/or the corresponding PBCH block may share the same frequency occasion and/or the same time domain occasion. In some embodiments, the frequency resource between the SS resource and the corresponding PBCH block can overlap and/or not overlap. In certain embodiments, the time resource between the SS resource and the corresponding PBCH block can overlap and/or not overlap.

Figure 8:
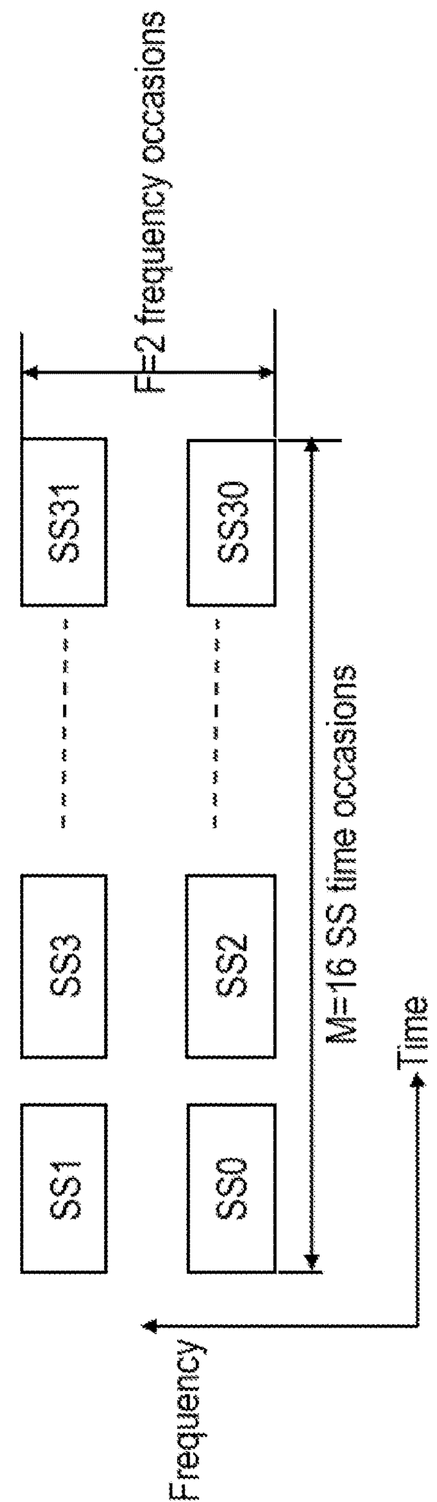
FIGS. 8-10 illustrate one PCI corresponding to more than one frequency SS occasion in one time SS occasion, in accordance with some embodiments of the present disclosure.
Figure 9:
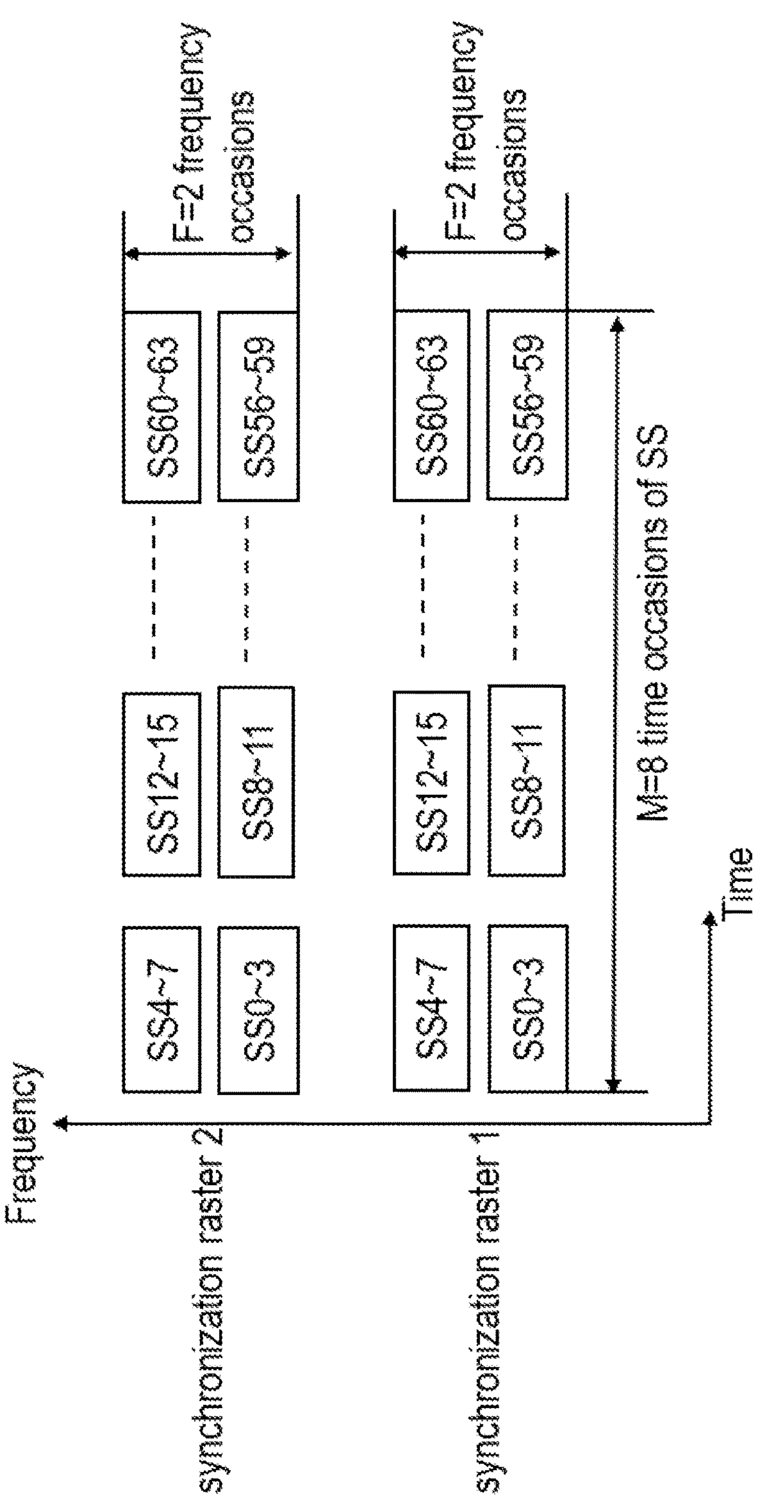
Figure 10:
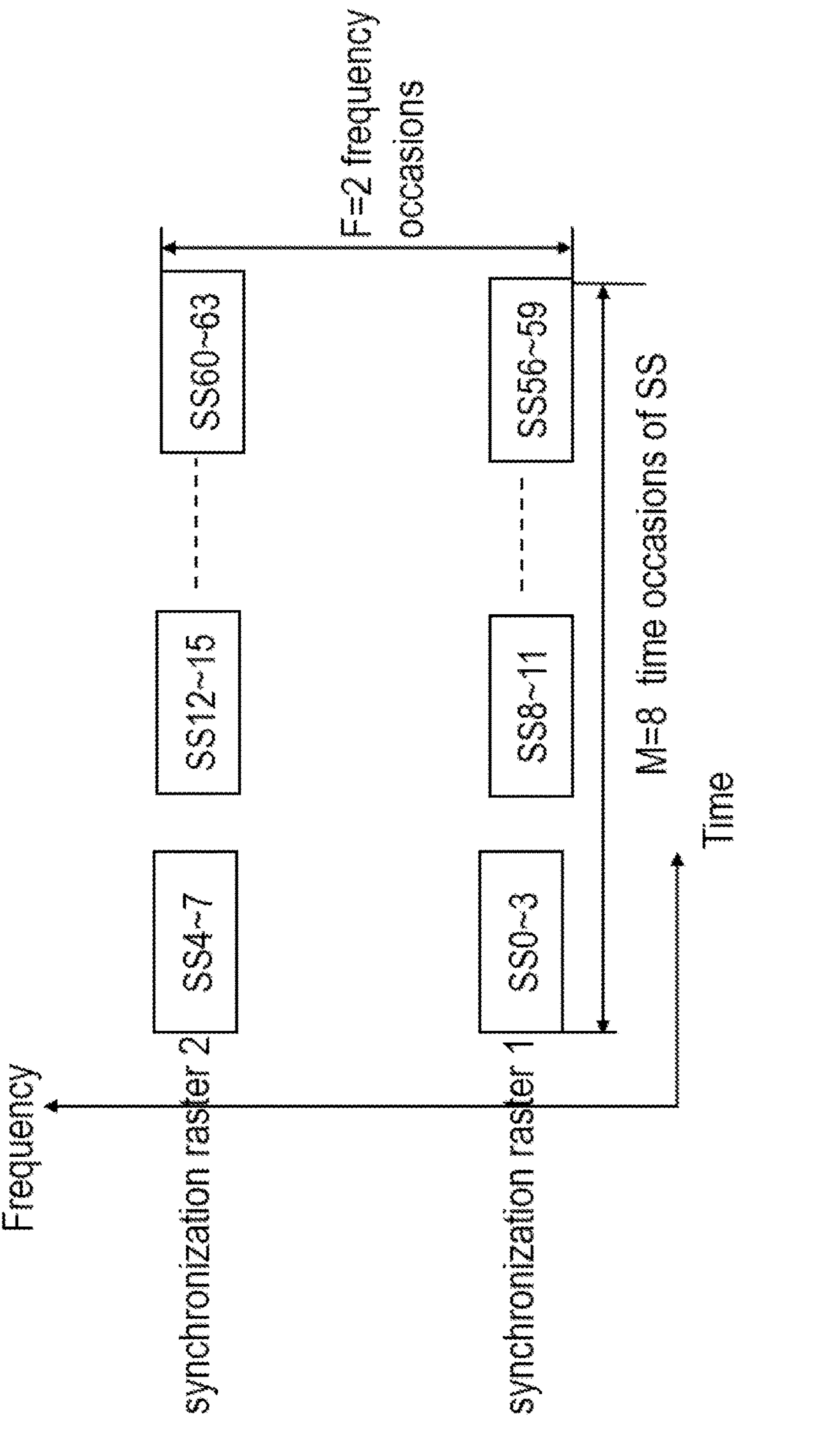

In FIG. 4 and/or FIGS. 6 and 7, the number of frequency occasions of the SS may correspond to 1. In some embodiments, the number F of frequency occasions of the SS resources for one PCI can be more than one. The SS resources can be first indexed in an ascending order across the N SS resources in a same SS occasion. Subsequently, the SS resources may be indexed in an ascending order across F SS frequency occasions in a same time occasion. Finally, the SS resources can be indexed across SS time occasions, as shown in FIGS. 8-10. In FIG. 8, one SS occasion may include one SS resource for one PCI. In some embodiments, one SS occasion may include more than one SS resource for one PCI. In FIG. 9, for one PCI, the F frequency occasions may correspond to a same synchronization raster. In FIG. 10, for one PCI, the F frequency occasions may correspond to different, separate, and/or distinct synchronization rasters. The wireless communication device may obtain and/or determine the index of the SS resources in F frequencies and/or with a same PCI.

In some embodiments, each wireless communication node (e.g., AP) in FIG. 3 can transmit, send, broadcast, and/or communicate at least one SS resource. Because there is more than one SS resource in a same occasion for one PCI, the wireless communication device (e.g., UE) may scan all the wireless communication nodes and/or find/determine/identify the set of wireless communication nodes (e.g. AP set) for the wireless communication device quickly (e.g., through few SS occasions). The maximum number M of candidate time occasions of the SS resources can be 8 (or other values), as in FIG. 4. In some embodiments, the value of M can be 1 (or other values).

In certain embodiments, each beam of a cell may correspond to a SS resource. If each beam corresponds to a SS resource, the wireless communication device (e.g., UE) may scan more than one beam in one time SS occasion, given that the wireless communication device can scan more than one beam simultaneously for one PCI. The wireless communication device can determine a best/optimum beam quickly.

In some embodiments, the N SS resources may correspond to one (or some other number of) element. The one element can include at least one of: one physical broadcast channel (PBCH) block, control resource set (CORESET) 0, one system information block (SIB), one serving cell, one physical cell index (PCI), an occasion of SS resources, one monitoring occasion of one common control channel, and/or a PRACH configuration. The one common control channel can be CORESET0, and/or other CORESETs with common downlink information.

B. Example 2

A SS resource may have at least two indices. The first type of index can be used to determine/obtain the information of the PBCH block corresponding to the SS resources, and/or to determine the monitoring occasion of the CORESET0 associated with the SS resource. The second type of index can be used to identify/determine the SS resource among SS resources of a PCI/PCI group, and/or to determine the PRACH resource of the one SS resource. In some embodiments, the PBCH block may correspond to more than one SS resource with a same first type of index of the SS resource. In some embodiments, one monitoring occasion of the CORESET0 may correspond to more than one SS resource with the same first type of index of the SS resource.

In some embodiments, the first type of index may include or correspond to the index of the time SS occasion that includes the SS resource. The second type of index may include or correspond to the index of the SS resource among one or more SS resources (e.g., all SS resources) for one PCI.

In some embodiments, the first type of index may include or correspond to the index of the SS occasion that includes the SS resource. The second type of index may include or correspond to the index of the SS resource among one or more SS resources (e.g., all SS resources) for one PCI.

In some embodiments, the first type of index may include or correspond to the index of the time SS occasion that includes the SS resource. The second type of index may include or correspond to the index of the SS resource among SS resources in one time SS occasion for one PCI.

In some embodiments, the first type of index may include or correspond to the index of the SS occasion that includes the SS resource. The second type of index may include or correspond to the index of the SS resource among SS resources in one time SS occasion for one PCI.

In some embodiments, the first type of index may include or correspond to the index of the SS occasion that includes the SS resource. The second type of index may include or correspond to the PCI of the SS resource.

C. Example 3

In some embodiments, one DMRS port of a PBCH block (e.g., the one element) may correspond to X SS ports. The value or parameter X can be larger than 1 (or other numbers). The one DMRS port of the PBCH may be QCL-ed with the X SS ports.

In some embodiments, one DMRS port group of a PBCH block may correspond to X SS ports. The at least one DMRS port group and the X SS ports may be QCL-ed. The one DMRS port group may include one or more DMRS ports. The one or more DMRS ports of the at least one DMRS port group may correspond to the same X SS resources. Each DMRS port in the at least one DMRS port group may be QCL-ed with the X SS ports.

Figures 11, 12:
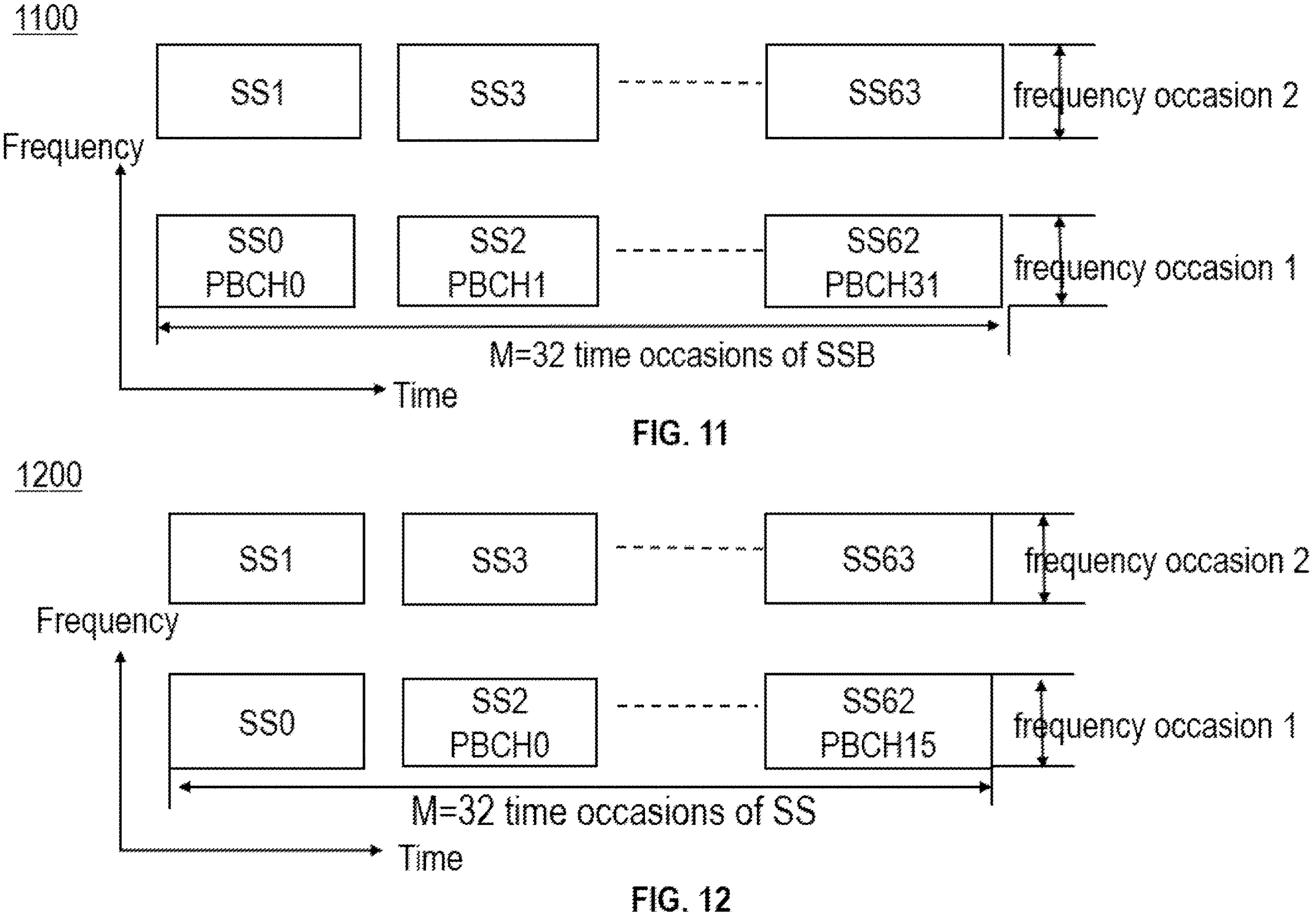
FIGS. 11-12 illustrate more than one SS resource corresponding to one PBCH, wherein the more than one SS resource can be in different frequency SS occasions and/or different time SS occasions, in accordance with some embodiments of the present disclosure.

In some embodiments, each of the X SS ports may correspond to one SS resource. The X SS ports may correspond to X SS resources. Each SS port may correspond to one SS resource. The X SS resources may be in one time frequency SS occasion. In one example, as shown in FIG. 4, the X may be smaller than or equal to N. In some embodiments, the X SS resources may be in one (e.g., a same) time occasion and/or in different/separate/distinct frequency occasions, as shown in FIG. 11. In FIG. 11, at least two SS resources in two SS frequency occasions and/or in one time SS occasion may correspond to a same PBCH block. In FIG. 11, a SS resource with an index of 2*n and/or a SS resource with an index 2*n+1 may correspond to a same PBCH block n, wherein n=0, 1, . . . , 31. In some embodiments, the X resources can be in different/distinct SS time occasions, as shown in FIG. 12. In FIG. 12, the SS resources with index 4*n, 4*n+1, 4*n+2, and/or 4*n+3 may correspond to a same PBCH block n, wherein n=0, 1, . . . , 15. In some embodiments, the X SS resources may correspond to the same PCI.

In some embodiments, the X SS resources may correspond to L PCIs. For example, the X SS resources may include one or more first SS resources and/or one or more second SS resources. The one or more first SS resources may correspond to a first PCI. The one or more second SS resources may correspond to a second PCI. The number of PCIs corresponding to the X SS resources can be smaller than or equal to X. If the number of PCIs of the X SS resources is X, each SS resource may correspond to (or be associated with) one respective PCI. If the number of PCIs of the X SS resources is smaller than X, one or more SS resources may correspond to a same PCI, and/or each SS resource can correspond to one PCI and/or a SS index. The sequence of each SS signal of the X SS resource may be according to the PCI and/or the SS resource index. The SS resource index can be a local index among SS resources in a same occasion and/or with one PCI. Alternatively, the SS resource index can be an absolute index among SS resources across occasions for one PCI.

A PBCH block may correspond to a time-frequency occasion. One or more PBCH blocks in different/separate time-frequency occasions can be different from each other, as shown in FIG. 11. For example, in FIG. 11, PBCH 1 and PBCH 2 may be different PBCH blocks.

In some embodiments, the X SS resources and/or X SS ports may correspond to one element. The one element can include at least one of: one PBCH block, CORESET 0, one SIB, one serving cell, one PCI, one occasion of SS resources, one monitoring occasion of one common control channel, and/or one PRACH configuration.

D. Example 4

One DMRS port of a PBCH block may correspond to X SS resources. The PBCH block may correspond to at least one time frequency PBCH occasion, and/or one DMRS port of the PBCH. The one DMRS port of the PBCH block may be QCL-ed with the X SS resources. The port number of the X SS resources can be same, but the ports are not the same. For example, a same port number of different SS resources may correspond to different antenna ports (e.g., the ports are not QCL-ed). In some embodiments, the port number of the X SS resources can be different. If two ports are QCL-ed, the two ports may be quasi-co-located with respect to one or more large-scale properties of the channels of the two ports. The large-scale properties may include at least one of: a delay spread, a Doppler spread, a Doppler shift, an average gain, an average delay, and/or one or more spatial receive (Rx) parameters.

In some embodiments, one DMRS port group of a PBCH block can correspond to X SS resources. The PBCH block may correspond to one time frequency PBCH occasion and/or one DMRS port group of the PBCH. The one DMRS port group may include one or more DMRS ports. If the one DMRS port group includes more than one DMRS port, different DMRS ports of the one DMRS group may be QCL-ed. For instance, different DMRS ports of the one DMRS port group may correspond to the same X SS resources. Each DMRS port of the one DMRS port group may correspond to the X SS resource. Each DMRS port of the one DMRS port group may be QCL-ed with the X SS resource.

The wireless communication device may obtain/determine the X SS resources associated with the PBCH block using at least one of the following methods. The number X may be carried with the information of the PBCH block. The information of the PBCH block can include at least one of: the bit carried in the PBCH block before the channel code, the scramble sequence added to the CRC of the PBCH block, the scramble sequence added to the bits of the PBCH block after the channel code, the sequence of DMRS of the PBCH block, the QCL-RS of the DMRS of the PBCH, the RE occupied by the DMRS of the PBCH block, and/or the RE occupied by the PBCH block. The time-frequency occasion of the X SS resources may be determined from the time frequency occasion of the PBCH block. The X SS resources may be in one SS occasion, and/or the X SS resources can correspond to one PCI. In some embodiments, the X SS resources may be in more than one SS occasion and/or in one (e.g., a same) SS time occasion. The X SS resources may correspond to at least one PCI.

In some embodiments, the X SS resources may correspond to one element. The one element can include at least one of: a PBCH block, CORESET0, a SIB, a serving cell, a PCI, an occasion of SS resources, a monitoring occasion of a common control channel, and/or one PRACH configuration.

E. Example 5

At least one PCI may have a PBCH block in a PBCH time-frequency occasion and/or N SS resources in a SS time-frequency occasion. The PBCH block and/or the N SS resources can be QCL-ed.

In some embodiments, the PBCH time-frequency occasion and/or the SS time frequency occasion may correspond to a SS/PBCH time-frequency occasion. The SS/PBCH time-frequency occasion may include the PBCH block and/or the N SS resources.

In some embodiments, the N SS resources may correspond to one element. The one element can include at least one of: a PBCH block, CORESET0, a SIB, a serving cell, a PCI, an occasion of SS resources, a monitoring occasion of a common control channel, and/or a PRACH configuration.

F. Example 6

A master information block (MIB) may indicate, provide, and/or specify a number C (e.g., an example value of X) of SS resources of a DMRS port of one monitoring occasion of CORESET0 to the wireless communication device. In some embodiments, the number C can be an integer. The DMRS port of the monitoring occasion of CORESET0 may be QCL-ed with the C SS resources. The monitoring occasion of the CORESET0 may be determined and/or obtained according to a SS resource index and/or the number C, such that $j_{SS}/C$ wherein $j_{SS}$ is the SS resource index. In some embodiments, the monitoring occasion of the CORESET0 may be determined according to an SS occasion index of the C SS resources. The C SS resources can correspond to one or more PCIs. The C SS resources may be in a SS occasion (e.g., a same SS occasion). The C SS resources may be in more than one SS occasion and/or one time occasion. In some embodiments, the C SS resources may be in different/separate SS time occasions. For example, the C SS resources may include the N SS resources of FIG. 4. In another example, the C SS resources may include the X SS resources of FIGS. 11-12.

In some embodiments, the C SS resources may correspond to a common control element. The common control element can include at least one of: a PBCH block, CORESET0, a SIB, a serving cell, a PCI, an occasion of SS resources, a monitoring occasion of a common control channel, and/or a PRACH configuration.

G. Example 7

In some embodiments, the DMRS of the PBCH may be a pseudo-random sequence generated by an initialized value. The initialized value can be determined/obtained according to at least one of the following formulas:

$$c_{init} = 2^{11}(\bar{\iota}_{SSB,timeoccasion}+1)\left(\left\lfloor\frac{N_{ID}^{cell}}{4}\right\rfloor+1\right)+2^{y}(f(N))+2^{2}(\bar{\iota}_{SSB,timeoccasion}+1)+\left(N_{ID}^{cell}\bmod 4\right). \quad \text{Formula 1}$$

$$c_{init} = 2^{11}(\bar{\iota}_{SSB,timeoccasion}+1)\left(\left\lfloor\frac{N_{ID}^{cell}}{4}\right\rfloor+1\right)+2^{6}(\bar{\iota}_{SSB,timeoccasion}+1)+\left(N_{ID}^{cell}\bmod 4\right) \quad \text{Formula 2}$$

The parameter $\bar{\iota}_{SSB,timeoccasion}$ can be the smallest for $\bar{L}_{max}=4$, $\bar{\iota}_{SSB,timeoccasion}=i_{SSB,timeoccasion}+4n_{hf}$. The parameter $n_{hf}$ may indicate/specify the number of the half-frame in which the PBCH is transmitted in a frame. In some embodiments, $n_{hf}=0$ for the first half-frame in the frame and/or $n_{hf}=1$ for the second half-frame in the frame. The parameter $i_{SSB,timeoccasion}$ may be (and/or indicate) the two least significant bits of the candidate SS time occasion index. For $\bar{L}_{max}>4$, $\bar{\iota}_{SSB,timeoccasion}=i_{SSB,timeoccasion}$. The parameter $i_{SSB,timeoccasion}$ may specify the three least significant bits of the candidate SS time occasion index. The parameter $\bar{L}_{max}$ may indicate, specify, and/or refer to the maximum number of candidate SS time occasions of the SS resources in a half frame.

H. Example 8

In some embodiments, a PBCH block (e.g., one element) may correspond to X SS resources. Each of the X SS resources may correspond to a PCI. The X SS resources may correspond to L PCIs. In some embodiments, the value of L may be larger than one (e.g., L>1). In another embodiments, the L can be smaller than or equal to X. If L is smaller than X, more than one SS resource of the X SS resources may be associated with a same PCI.

In some embodiments, the information of the PBCH block may be determined/obtained according to (or by using) the X, and/or the X SS resources. The information of the PBCH block may include at least one of: the bit carried by the PBCH block before the channel code, the scramble sequence added to the CRC of the PBCH block, the scramble sequence added to the bits of the PBCH block after the channel code, the sequence of the DMRS of the PBCH block, the QCL-RS of the DMRS of the PBCH, the RE occupied by the DMRS of the PBCH block, and/or the RE occupied by the PBCH block. For example, the DMRS port of the PBCH block can be QCL-ed with the X SS resources, each of which is associated with a respective PCI.

Figure 13:
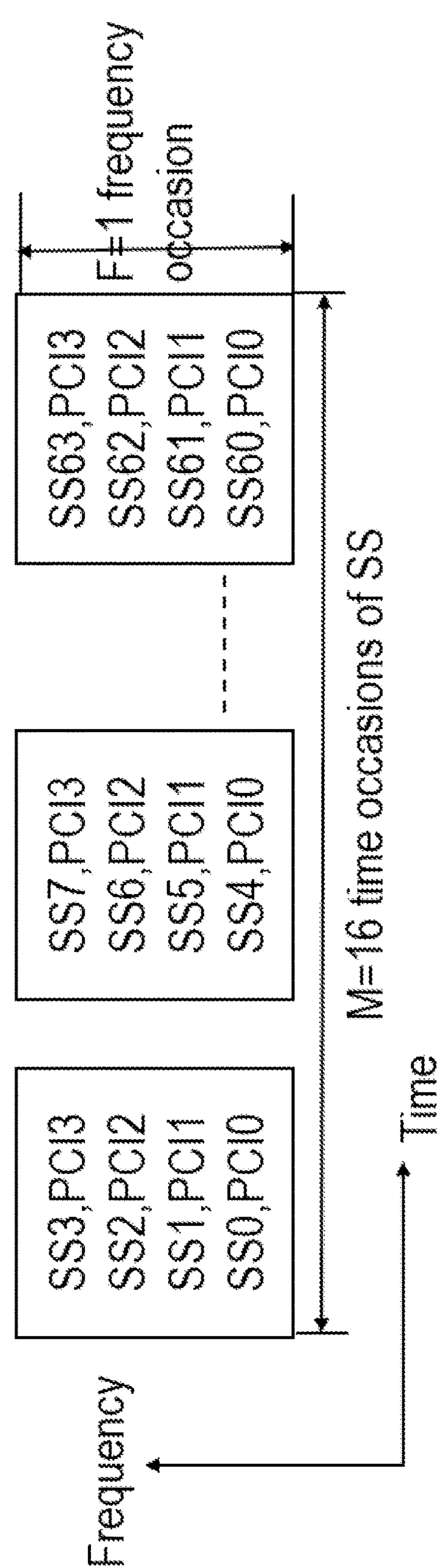
FIG. 13 illustrates X SS resources of L PCIs numbered together, in accordance with some embodiments of the present disclosure.
Figure 14:
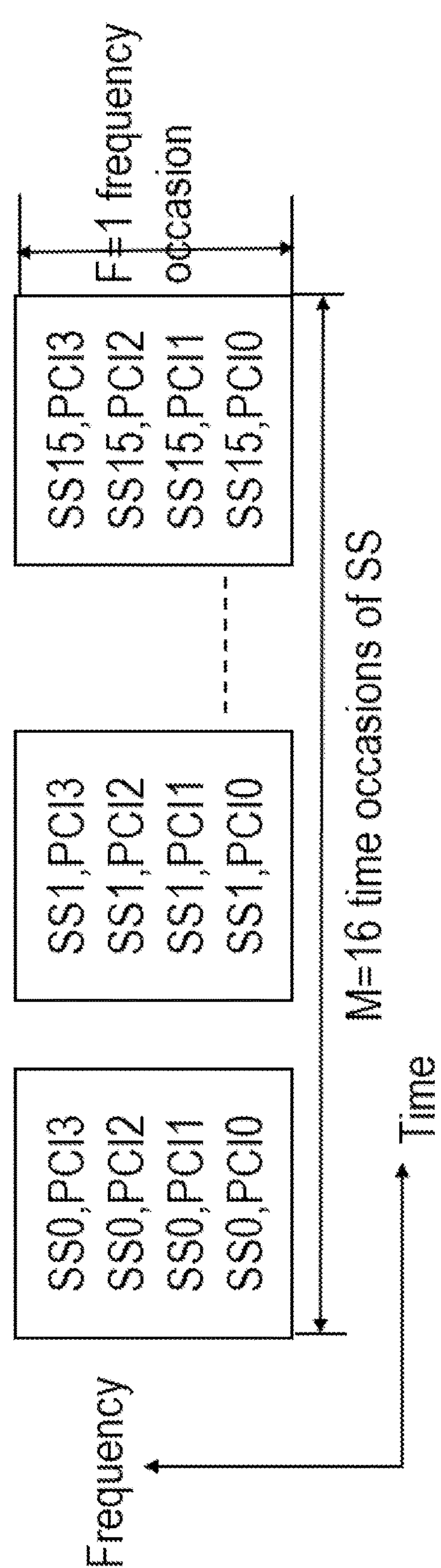
FIG. 14 illustrates one SS resource identified by a PCI and an index of the SS resources, in accordance with some embodiments of the present disclosure.

In some embodiments, the X SS resources may be in a same time-frequency SS occasion, as shown in FIG. 13 and FIG. 14, wherein X has a value of 4. In the following description, the X SS resources may correspond to a PBCH block, and/or may be in a same time-frequency SS occasion. The X SS resources in the same time-frequency occasion can be transmitted and/or sent by using X synchronization signals. Each of the X synchronization signals may include a primary synchronization signal (PSS) and/or secondary synchronization signal (SSS). The X sequences of the X synchronization signals may correspond to X PCIs. The SS resources in an occasion can be uniformly numbered, as shown in FIG. 13. In some other embodiments, the X SS resources in an occasion may have a same SS index. Each of the X SS resources can be identified according to the PCI and the same SS resource index, as shown in FIG. 14. The X SS resources may correspond to an X sequence of SS.

The wireless communication device (e.g., UE) may determine one or more PRACH resources for each SS resource of the X SS resources according to a same signaling. For example, the wireless communication device may determine/obtain the PRACH resources for each SS resource of the X SS resources according to the information provided by a SIB (such as SIB1). The wireless communication device may determine the PRACH resources for each SS resource of the X SS resources from a signaling, according to at least one of the following methods.

Method 1: The SS resources in a SS occasion can be uniformly numbered (e.g., indexed or index-numbered), as shown in FIG. 13. First, the SS resources may be indexed in an ascending order across the X SS resources in a same time-frequency occasion. Second, the SS resources can be indexed in an ascending order across F SS frequency occasions in a same time occasion (if F is larger than 1). Third, the SS can be indexed in an ascending order across M time domain occasions. In FIG. 13, the F may be 1, and therefore, the second step can be skipped. The SIB1 may provide, specify, and/or indicate a set of PRACH parameters. The set of PRACH parameters may include a PRACH occasion parameter, a preamble parameter, the number of SS resources associated with a PRACH occasion, the number of preambles associated with one SS resource, preambles for one PCI, preambles for one SS resource, a number of preambles for each of the X SS resources, a number of SS resources associated with one PRACH occasion, a number of SS resources in a SS occasion and associated with one PRACH occasion, and/or number of PCIs associated with one PRACH occasion. The PRACH occasion parameter can include a time resource of the PRACH occasion and/or a frequency resource of the PRACH occasion. The unified M*N SS indexes may be mapped to a PRACH resource comprising a PRACH occasion and/or a preamble, as shown in FIG. 15.

Figure 16:
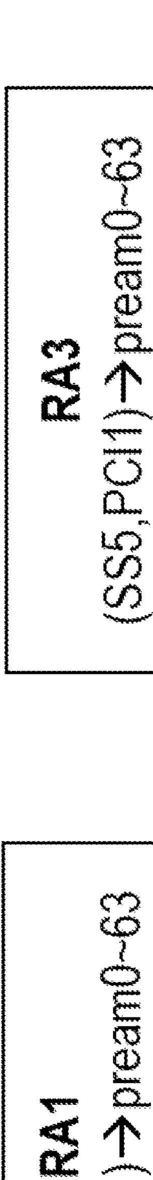
FIG. 16 illustrates one signaling informing a respective PRACH configuration for each PCI of the L PCIs, in accordance with some embodiments of the present disclosure.
Figure 16:
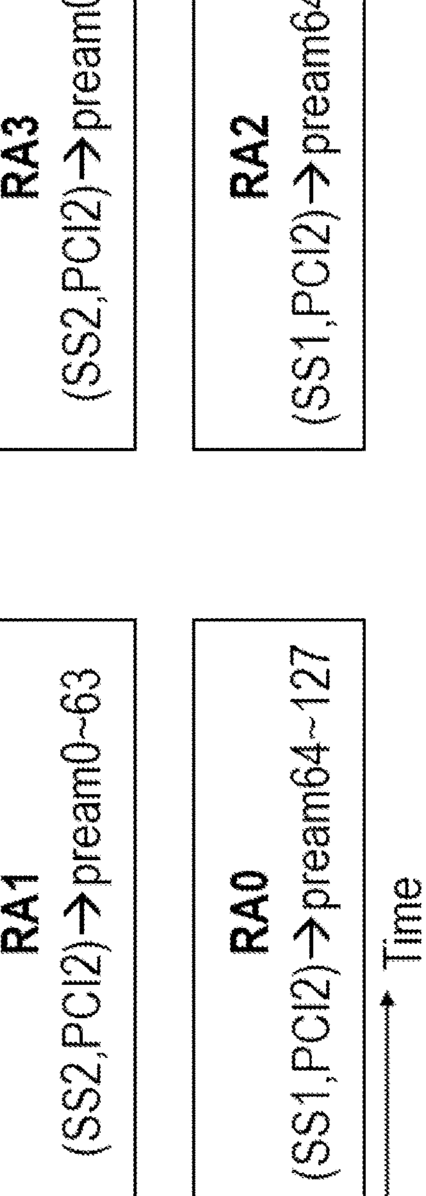

Method 2: The SS may be numbered/enumerated (e.g., indexed or index-numbered) for each PCI of the X PCIs associated with the X SS resources. The SS resources with different/separate PCIs can be numbered respectively, as shown in FIG. 14. The X PCIs may share a MIB and/or SIB. The shared SIB can indicate X sets of PRACH parameters, each of which is for a PCI of the X PCIs, as shown in FIG. 16. In FIG. 16, the PRACH occasions of different PCIs can be different. Each set of PRACH parameters may include at least one of: a time resource of PRACH occasions, a frequency resource of PRACH occasions, preambles for one PCI, preambles for one SS resource, a number of preambles for one SS resource, a number of preambles for each of the X SS resources, a number of SS resources associated with one PRACH occasion, a number of SS resources in a SS occasion and associated with one PRACH occasion, and/or a number of PCIs associated with one PRACH occasion. The wireless communication device (e.g., UE) may obtain/determine the parameter(s) of the transmitted PRACH, according to the PCI associated with the selected SS resources. In some embodiments, a first type of PRACH parameter for the X PCIs may be the same. A second type of PRACH parameter for the X PCIs may be different. Each of the X sets of PRACH parameters may include the second type of PRACH parameter. The second type of PRACH parameter may include at least one of: a PRACH occasion parameter and/or a preamble parameter. The wireless communication device may obtain 64 preambles for a time-frequency PRACH occasion for each PCI in the PCI group. The X PCIs may share a same PRACH occasion, but each PCI may have different preamble groups. In some embodiments, the X PCIs can share a same preamble parameter, but each different PCI is with a different PRACH occasion. In some embodiments, each of the X PCIs may correspond to a respective set of PRACH parameters of the X set of PRACH parameters. For example, as shown in FIG. 17, the PRACH occasion may be the same for the X PCIs, and/or the preambles may be different for the X PCIs.

Figure 17:
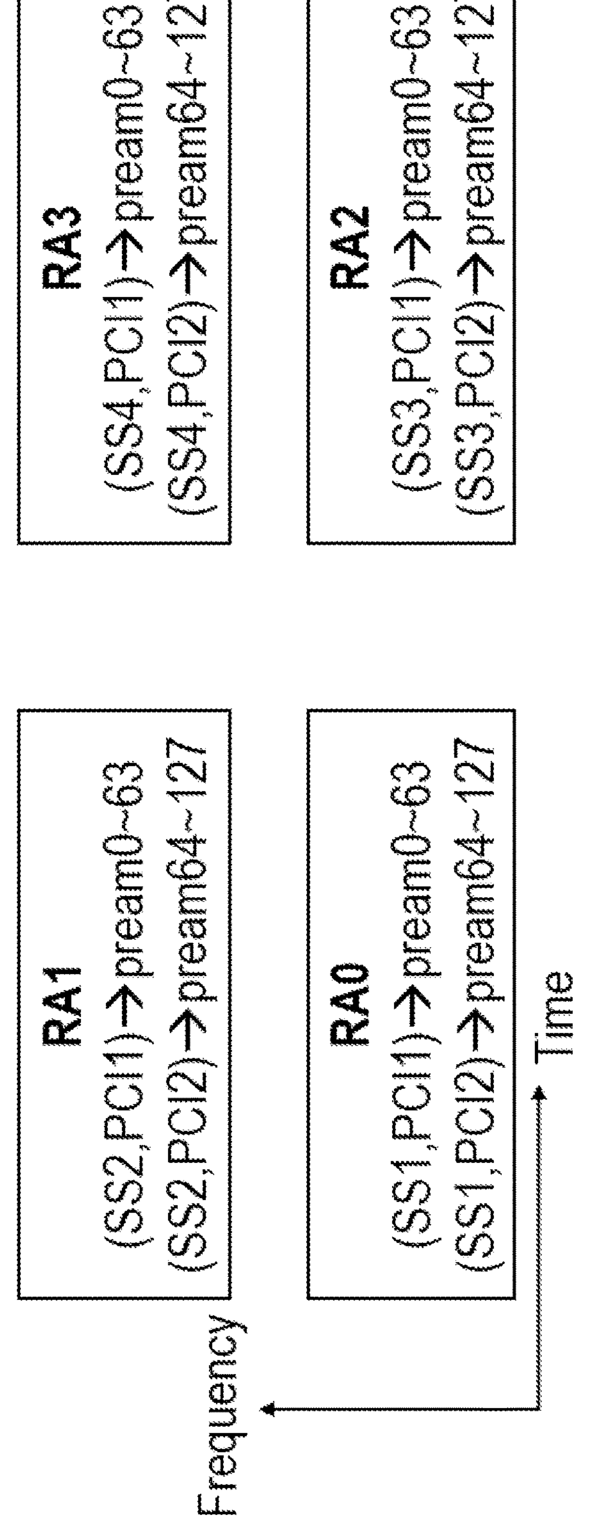
FIG. 17 illustrates a first type of PRACH parameter configuration being same for the L PCIs (such as a PRACH occasion), in accordance with some embodiments of the present disclosure.

In FIGS. 15-17, the RA can indicate the PRACH occasion. In FIGS. 15-17, the phrase "(PCI n, SS m)→preamble p" may specify that the SS index m of the PCI n is associated with the preamble p of the PRACH occasion.

In some embodiments, the X SS resources may share a same MIB. The X SS resources can share a same PBCH. One DMRS port of the PBCH block may be shared by the X SS resources, each of which is associated with a respective PCI. The information of the PBCH can be determined according to (or based on) the X PCIs, and/or X.

In one example, the DMRS of the PBCH can be a pseudo-random sequence. The pseudo-random sequence may be generated by an initialized value. The initialized value may be determined according to at least one of the following formulas:

Formula 1

$$c_{init} = 2^{11}\left(\bar{i}_{SSB,timeoccasion}+1\right)\left(\left\lfloor N_{ID}^{cell}/X\right\rfloor+1\right)+\left(\bar{i}_{SSB,timeoccasion}+1\right)$$

-continued

Formula 2

$$c_{init} = 2^{11}(\bar{i}_{SSB,timeoccasion}+1)(\lfloor N_{ID}^{cell}/X \rfloor+1)+2^{6}(\bar{i}_{SSB,timeoccasion}+1)$$

Formula 3

$$c_{init} = 2^{2}(\bar{i}_{SSB,timeoccasion}+1)(\lfloor N_{ID}^{cell}/X \rfloor+1)+\bar{i}_{SSB,timeoccasion}$$

Formula 4

$$c_{init} = 2^{3}(\bar{i}_{SSB,timeoccasion}+1)(\lfloor N_{ID}^{cell}/X \rfloor+1)+(\bar{i}_{SSB,timeoccasion}+1)$$

Formula 5

$$c_{init} = 2^{11}(\bar{\iota}_{SSB,timeoccasion}+1)(N_{ID,reference}^{cell}+1)+(\bar{\iota}_{SSB,timeoccasion}+1)$$

Formula 6

$$c_{init} = 2^{11}(\bar{\iota}_{SSB,timeoccasion}+1)(N_{ID,reference}^{cell}+1)+2^{6}(\bar{\iota}_{SSB,timeoccasion}+1)$$

Formula 7

$$c_{init} = 2^{2}(\bar{\iota}_{SSB,timeoccasion}+1)(N_{ID,reference}^{cell}+1)+\bar{\iota}_{SSB,timeoccasion}$$

Formula 8

$$c_{init} = 2^{3}(\bar{\iota}_{SSB,timeoccasion}+1)(N_{ID,reference}^{cell}+1)+(\bar{\iota}_{SSB,timeoccasion}+1)$$

Formula 9

$$c_{init} = 2^{11}(\bar{\iota}_{SSB,timeoccasion}+1)\left(\left\lfloor \frac{N_{ID}^{cell}}{4} \right\rfloor+1\right)+2^{6}(\bar{\iota}_{SSB,timeoccasion}+1)+(N_{ID,new}^{cell} \bmod 4)$$

The parameter $\bar{\iota}_{SSB,timeoccasion}$ can be the smallest for $\bar{L}_{max}=4\bar{\iota}_{SSB,timeoccasion}=i_{SSB,timeoccasion}+4n_{hf}$. The parameter $n_{hf}$ may indicate/specify the number of the half-frame in which the PBCH is transmitted in a frame. In some embodiments, $n_{hf}=0$ for the first half-frame in the frame and/or $n_{hf}=1$ for the second half-frame in the frame. The parameter $i_{SSB,timeoccasion}$ may be (and/or indicate) the two least significant bits of the candidate SS/PBCH block time occasion index. For $\bar{L}_{max}>4$, $\bar{\iota}_{SSB,timeoccasion}=i_{SSB,timeoccasion}$. The parameter $i_{SSB,timeoccasion}$ may specify the three least significant bits of the candidate SS/PBCH time occasion index. The parameter $\bar{L}_{max}$ may indicate, specify, and/or refer to the maximum number of candidate time occasions of the SS/PBCH blocks in a half frame. In some embodiments, the X can be replaced with N in at least one of formulas 1 through 4. The N can indicate and/or specify the number of SS resources in a same time SS occasion in the X resources. In some embodiments, N may be smaller than or equal to X.

In some embodiments, $$N_{ID,reference}^{cell}$$

can be a predefined PCI among the X PCIs. For example, $$N_{ID,reference}^{cell}$$

may be the lowest PCI of the X PCIs. In some embodiments, $$N_{ID,reference}^{cell}$$

can be referenced as the PCI group index. A PCI group may include the X PCIs. The $$N_{ID}^{cell}$$

may be the PCI associated with the preamble transmitted by the wireless communication device in a PRACH access. Through the cell search process, according to the PSS and/or the SSS, the wireless communication device may acquire/obtain/establish/configure time and frequency synchronization with a cell, and/or detect the physical layer cell ID of the cell. The physical layer cell ID of the cell may include or correspond to at least one of:

$$\lfloor N_{ID}^{cell}/X \rfloor \text{ and / or } N_{ID,new}^{cell} = \left\lfloor \frac{N_{ID}^{cell} - N_{ID}^{cell} \bmod 4}{4 * X} \right\rfloor.$$

In some embodiments, the X PCIs may include a PCI set of $$\{PCI = 4n + a,\ n = x*L,\ x*L+1,\ \ldots,\ x*L+L-1\},\ \text{or}$$

$$\{PCI = 4n + a,\ n = x*P,\ x*P+1,\ \ldots,\ x*P+P-1\},$$

wherein P is smaller than or equal to L. In some embodiments, a may have value from the set {0, 1, 2, 3}. In some embodiments, x may be an integer equal to or larger than 0 (or other numbers). As such, Formula 9 can be used to determine the sequence of the DMRS port of the PBCH block. If the P is smaller than L, the parameter a can include or correspond to one or more values from the set {0, 1, 2, 3}.

Through the cell search process, according to the PSS and/or the SSS, the wireless communication device may acquire/obtain/configure/establish time and frequency synchronization with a cell group to detect/determine/identify the physical layer cell group ID of the physical layer cell group. The physical layer cell group ID of the physical layer cell group may be one of $$\lfloor N_{ID}^{Cell}/X \rfloor,\ N_{ID,reference}^{Cell},$$

and/or $$N_{ID,new}^{cell} * 4 + N_{ID}^{cell} \bmod 4.$$

The physical layer cell group ID can be used to generate a scrambling sequence of a channel, and/or used to generate a sequence of a signal.

For example, the RE of the DMRS port of the PBCH block and/or the RE of the PBCH block can be determined according to at least one of:

$$X,\ \lfloor N_{ID}^{Cell}/X \rfloor,\ N_{ID,reference}^{cell},$$

or $$N_{ID,new}^{cell} * 4 + N_{ID}^{cell} \bmod 4.$$

In some embodiments, one PBCH block may correspond to X SS resources. Some of the X SS resources may correspond to different PCIs. The X SS resources may correspond to L PCIs. In some embodiments, L may be smaller than or equal to X. In some embodiments, L can be larger than one.

In some embodiments, the X SS resources may be in a same SS time-frequency occasion.

In some embodiments, the X SS resources may be in a same SS time occasion and/or in different frequency occasions.

In some embodiments, the X SS resources can be in different time occasions.

In some embodiments, the X PCIs and/or the X SS resources may correspond to one element. The common control element can include at least one of: a PBCH block, CORESET0, a SIB, a serving cell, an occasion of SS resources, a monitoring occasion of a common control channel, and/or a PRACH configuration.

I. Example 9

The wireless communication node (e.g., gNB) may transmit, send, and/or broadcast a signaling (e.g., RRC signaling and/or other types of signaling) to inform and/or provide a PRACH resource. The signaling may include/specify a SS resource index and/or a PCI index corresponding to the PRACH resource. The wireless communication device (e.g., UE) may receive and/or obtain the PRACH resource according to the SS resource index, the PCI index, and/or a mapping between PRACH resources and/or a (SS index, PCI index). The PRACH resource may include a PRACH occasion, and/or a PRACH occasion with a preamble.

For example, RRC signaling may indicate the PRACH resource. As such, the RRC signaling may include the SS resource index and/or the PCI index associated with (or corresponding to) the PRACH resource.

In one example, if the CRC of the downlink control information (DCI) (e.g., DCI format 1_0) is scrambled by a radio network temporary identifier (RNTI) (e.g., C-RNTI) and the "frequency domain resource assignment" field are all ones, the DCI can be used for a random access procedure initiated by a PDCCH order. The DCI may include the PCI and/or the SS resource index. The wireless communication device may obtain/determine the PRACH resource according to the SS resource index and/or the PCI.

In some embodiments, the DCI (e.g., DCI format 1_0) for the random access procedure initiated by a PDCCH order, can include the SS resource index, the PCI, and/or the frequency location of the SS resource. In some embodiments, the DCI can include the SS resource index, the PCI, the frequency location of the SS resource, and/or the subcarrier space of the SS resource. In some embodiments, RRC signaling (and/or other types of signaling) can be used to pre-configure a plurality of SS configurations. The DCI (e.g., DCI 1_0) can include/indicate/provide/specify the index of the SS configuration. The SS configuration may include at least one of: the SS resource index, the PCI, the frequency location of the SS resource, and/or the subcarrier space of the SS resource. The wireless communication device (e.g., UE) may obtain the PRACH resource based on the indicated SS configuration. Following at least one of: the PCI, the frequency location of the SS resource, the subcarrier space of the SS resource, and/or the SS configuration index can be indicated in the reserved bits field of the current DCI (e.g., DCI 1_0).

In some embodiments, one or more PCIs may correspond to one element. The one element can include at least one of: a PBCH block, a CORESET0, a SIB, a serving cell, a PCI, an occasion of the SS resources, a monitoring occasion of a common control channel, and/or a PRACH configuration.

J. Example 10

The wireless communication node (e.g., gNB) may transmit, send, and/or broadcast a signaling (e.g., RRC signaling and/or other types of signaling) to inform and/or indicate a PRACH resource. The signaling may include/provide a CSI-RS resource index and/or a PCI index corresponding to the PRACH resource. The wireless communication device (e.g., UE) may obtain and/or determine the PRACH resource according to (or by using) the CSI-RS resource index, the PCI index, and/or a mapping between PRACH resources and a SS resource index and/or a PCI index. The PRACH resource may include a PRACH occasion, and/or a PRACH occasion with a preamble. The signaling may include or correspond to at least one of: RRC signaling, medium access control control element (MAC-CE) signaling, and/or DCI signaling.

In some embodiments, the signaling may include/specify/indicate the CSI-RS resource index, the PCI, the frequency location of the SS resource, and/or a subcarrier space of the SS resource. The SS resource may correspond to the CSI-RS resource. For example, the SS resource may be QCL-ed with the CSI-RS resource.

In some embodiments, the wireless communication device (e.g., UE) may obtain and/or determine a PRACH occasion according to the SS resource index corresponding to the CSI-RS resource and/or the second information. The second information may include at least one of the SS resource: the PCI index, the frequency location of the SS resource, and/or the subcarrier space of the SS resource. The PRACH resource may include the PRACH occasion, and/or the PRACH occasion with the preamble. Different/separate/distinct combinations of the SS resource index and/or the second information may correspond to different PRACH resources. For example, the SS resource may be QCL-ed with the CSI-RS resource.

In some embodiments, one or more PCIs may correspond to a common control element. The common control element may include at least one of: a PBCH block, CORESET0, a SIB, a serving cell, a PCI, an occasion of the SS resources, a monitoring occasion of a common control channel, and/or a PRACH configuration.

In one or more embodiments discussed herein (e.g., examples 1 though 10), the parameter X may be interchangeable with some or all of the values/parameters C, N, L, etc., discussed herein.

K. Reference Signaling Design and Configuration

Figure 18:
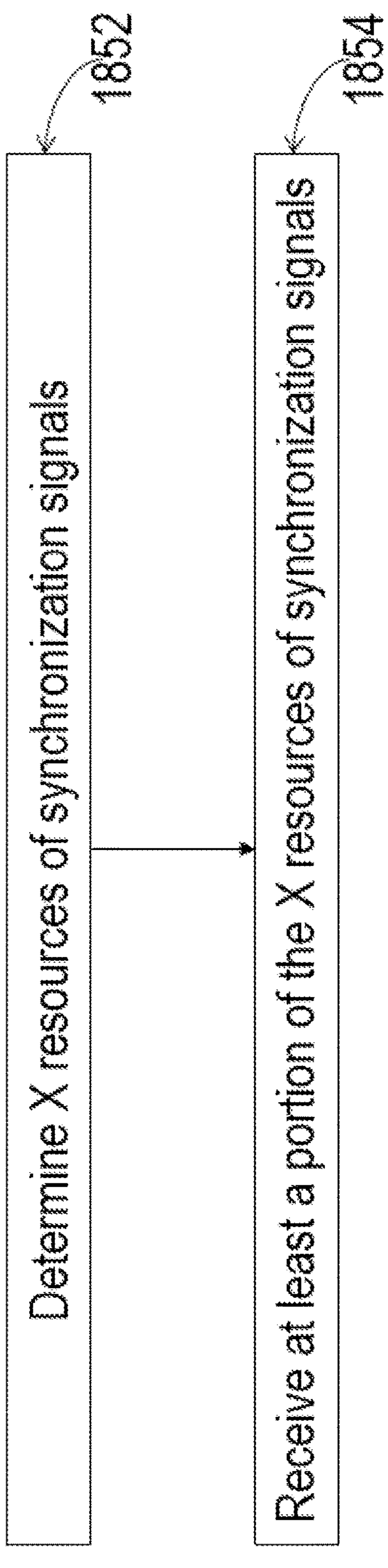
FIG. 18 illustrates a flow diagram of an example method reference signaling design and configuration, in accordance with an embodiment of the present disclosure.
Figure 19:
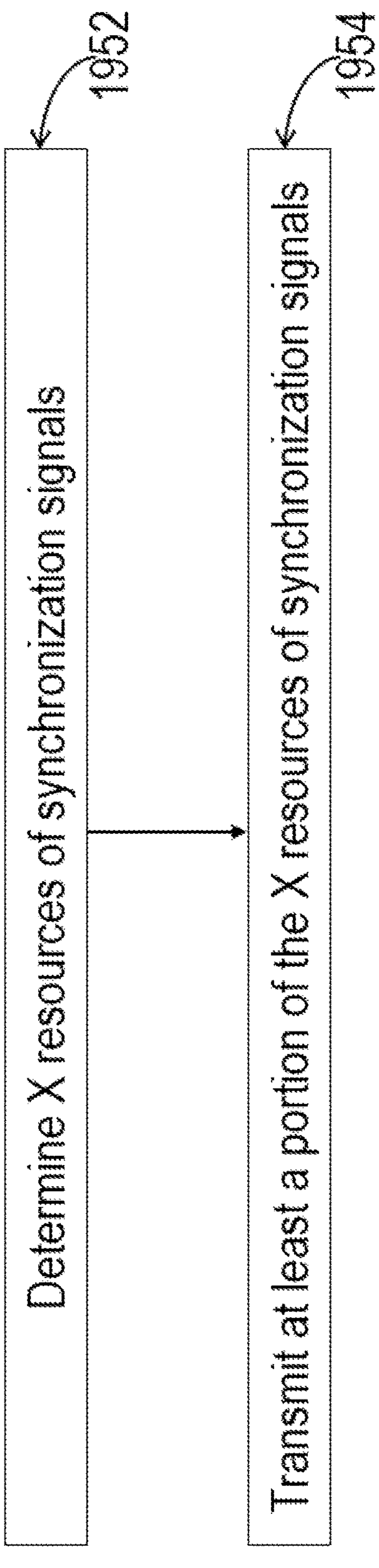
FIG. 19 illustrates a flow diagram of an example method reference signaling design and configuration, in accordance with an embodiment of the present disclosure.

FIGS. 18 and 19 illustrate a flow diagram of methods 1850 and 1950 for reference signaling design and configuration. The method 1850 and/or method 1950 may be implemented using any of the components and devices detailed herein in conjunction with FIGS. 1-17. In overview, the method 1850 may include determining X resources of synchronization signals (1852). The method 1850 may include receiving at least a portion of the X SS resources (1854). In overview, the method 1950 may include determining X resources of synchronization signals (1952). The method 1950 may include transmitting at least a portion of the X SS resources (1954).

Referring now to operation (1852), and in some embodiments, the wireless communication device (e.g., UE) may determine/identify X resources of synchronization signals (SS resources). In some embodiments, the wireless communication node (e.g., the BS) may determine and/or identify the X SS resources (1952). In one example, the wireless communication device may receive the X SS resources during a PRACH process for accessing a cell and/or a cell group. If the wireless communication device receives the X SS resources, the wireless communication device may determine the X SS resources according to one or more rules. If the wireless communication device accesses a cell/cell group, the wireless communication device may determine the X SS resources according to a signaling, such as RRC signaling, MAC-CE signaling, DCI signaling, and/or other types of signaling. In one example, the wireless communication device may perform blind detection to determine the X SS resources. In some embodiments, the wireless communication device may determine the X SS resources according to at least one of: a rule, whether the PCI of the X SS resources belongs to a PCI group, the location of the X SS resources, and/or a subcarrier space of the X SS resources.

In some embodiments, the wireless communication device may determine a (index) numbering and/or indexing for a plurality of SS resources. For example, the wireless communication device may determine the numbering/indexing according to (or by using) an ascending order across each set of X SS resources in a corresponding time-frequency occasion, then according to an ascending order across time occasions of SS resources. In another example, the wireless communication device may determine the numbering/indexing according to an ascending order across each set of X SS resources in a corresponding time-frequency occasion, then according to an ascending order across frequency occasions in a same time resource, then according to an ascending order across time occasions SS resources. In yet another example, the wireless communication device may determine the numbering/indexing according to an ascending order across time occasions of SS resources, then according to an ascending order across each set of X SS resources in a corresponding time-frequency occasion.

In some embodiments, X may be a positive integer value greater than 1 (or other numbers). X may be interchangeable with some or all of the values/parameters C, N, and/or other values, as discussed herein. In some embodiments, X may be a predefined, preconfigured, and/or predetermined value (e.g., a default value, specified or negotiated with a wireless communication node)). In some embodiments, X may be determined (e.g., by the wireless communication device and/or the wireless communication node) according to at least one of: a PCI of at least one of the X resources, information of the one element, a carrier frequency of an SS occasion of the X SS resources, a sub-carrier spacing (SCS) of the X SS resources, a PCI group including at least one of the X resources, a location of the SS occasion, and/or a mapping relationship between multiple SS resources and multiple elements. The one element can be in the multiple elements. For example, different/separate/distinct PCI groups may be associated with different values of X. If the wireless communication device receives a SS resource, the wireless communication device may determine X and/or the X SS resources according to (or by using) the PCI group of the SS resources. For example, if the PCI of the received SS resource is in a first PCI group, the value of X can be 1 (or other values). If, for instance, the PCI of the received SS resource is in a second PCI group, the value of X may be 4. In some embodiments, the intersection of different PCI groups may be empty. In some embodiments, an available resource of a downlink channel and/or signal may be determined according to transmitted SS resources. In some embodiments, a type of an OFDM symbol may be determined according to the transmitted SS resources. The type of the OFDM symbol may comprise downlink, uplink, and/or flexible. In some embodiments, a mapping relationship between PRACH resources and the transmitted SS resources may be determined. In some embodiments, the transmitted SS resources of the X resources may be received.

In some embodiments, the wireless communication device may obtain/determine a mapping relationship (and/or association/link) between one or more PRACH resources and the plurality of SS resources. The one or more PRACH resources may include at least a PRACH occasion and/or a preamble. The preamble can be transmitted/sent on the PRACH occasion. At least one PRACH occasion may include a time resource and/or frequency resource for transmitting the preamble. In some embodiments, the wireless communication device may obtain/determine the mapping relationship according to at least one of: a physical layer cell index, a cell group index, and/or a configuration of PRACH parameter. In one example, the wireless communication device may obtain the mapping relationship based on (or according to) indexes of the plurality of SS resources. In some embodiments, the wireless communication device may report, provide, specify, and/or indicate (e.g., to a wireless communication node) an index of a selected SS resource based on the indexes of the plurality of SS resources. For example, the wireless communication device may select a SS resource among the plurality of SS resources. The wireless communication device can report the index of the selected SS resource to a gNB. The index of the selected SS resource may be determined according to the rule of numbering the plurality of SS resources.

Referring now to operation (1854), and in some embodiments, the wireless communication device may receive and/or obtain (e.g., from the wireless communication node(s), such as a base station and/or a plurality of APs) at least a portion of the X SS resources. For instance, the wireless communication node (e.g., base station) may determine the X SS resources and/or send/transmit/communicate at least a portion of the X SS resources to the wireless communication device (1954). In one example, the wireless communication device may perform a reception of at least a portion of the X SS resources responsive to performing blind detection to determine the X SS resources. In some embodiments, the X SS resources may be associated/related with/to one element. If the X SS resources are associated with the one element, at least one DMRS port of the one element may be associated/related with the X SS resources. If the X SS resources are associated with the one element, each DMRS port of one DMRS port group of the one element can be associated with the X SS resources. In some embodiments, information of the one DMRS port or the each DMRS port may be determined according to (or based on) the X SS resources. The information of the one DMRS port or the each DMRS port may include a quasi co-location reference signal (QCL-RS) of the one DMRS port or the each DMRS port and/or a sequence of the one DMRS port or the each DMRS port. The information of the one DMRS port or the each DMRS port may include a resource element (RE) occupied by the one DMRS port or the each DMRS port.

In some embodiments, the one element may include or correspond to (or comprise) one time-frequency occasion of the SS resources and/or one PCI. The X SS resources may occupy the one time-frequency occasion. The X SS resources may correspond to the one PCI. In some embodiments, an SS sequence of each of the X SS resources may be determined and/or identified according to (or based on) the one PCI and/or an index of the corresponding SS resource (e.g., the each of the X SS resources). In some embodiments, the index of the corresponding SS resource may include or correspond to an index of the corresponding SS resource among the X SS resources. In some embodiments, each of the X SS resources may correspond to a common control element. For instance, each of the X SS resources may share a same information of the PBCH block, for example. The common control element may comprise at least one of: one PBCH block, one monitoring occasion of a CORESET (e.g., CORESET 0), one SIB, one configuration of PRACH parameters, and/or the CORESET 0. In some embodiments, a SS resource of the X SS resources may be identified and/or determined according to the one PCI and/or an index of the SS resource among the X SS resources. For instance, the wireless communication device may use the one PCI and/or the index of the SS resources to identify and/or determine a SS resources of the X SS resources.

In some embodiments, the X SS resources may be associated/related with the one element. If the X SS resources are associated with the one element, one DMRS port of the one element can be quasi co-located with the X SS resources. In one example, if the X SS resources are associated with the one element, information of the one element may be determined according to at least one of: X, one SS resource with a predefined feature among the X SS resources, one resource of the X SS resource, and/or the X SS resources. In another example, information of the one element may be the same for each of the X SS resources, if the X SS resources are associated with the one element. In another example, information of the one element may be determined according to a time domain index of a time-frequency occasion (e.g., if the X SS resources are associated with the one element). The time-frequency occasion may include the X SS resources. In some embodiments, the wireless communication device may receive at least a portion of the X SS resources. The wireless communication device may receive the X SS resources according to a signaling (e.g., RRC signaling, MAC-CE signaling, and/or other types of signaling). The signaling can include, provide, specify, and/or indicate a bitmap. The bitmap also can be got according to a rule. In some embodiments, the X SS resources may correspond to 1 (or other numbers) bit in the bitmap. The 1 bit can indicate/specify whether the X SS resources are transmitted by a wireless communication node. In some embodiments, the X SS resources may correspond to X bits in the bitmap. Each of the X bits may indicate whether at least one SS resource of the X SS resources is transmitted by the wireless communication node.

In some embodiments, the X SS resources may correspond to L physical cell indexes (PCIs). The L may be an integer value greater than 1 (or other values). In some embodiments, L may be smaller than or equal to X. In some embodiments, each of the X SS resources may correspond to one PCI of the L PCIs. In some embodiments, a sequence or information of the one element may be determined according to at least one of: the L PCIs, one PCI with predefined feature among the L PCIs, L, a value equal to 4, Y, M, a PCI group index, and/or $\lfloor PCI/L \rfloor$. In some embodiments, the sequence may include at least one of: a scrambling sequence of a physical downlink channel, and/or a sequence of a signal. In some embodiments, M can specify and/or indicate a maximum number of candidate time SS occasions in a frame. In some embodiments, Y can be a number of demodulation reference signal (DMRS) patterns of the one element. For example the Y can be 4 or other value. In some embodiments, the PCI group may include the L PCIs. In some embodiments, the PCI can include or correspond to at least one PCI of the L PCIs. In some embodiments, a sequence and/or information of the one element may be the same for the L PCIs (e.g., each of the L PCIs). In some embodiments, the L PCIs may correspond to one physical layer cell index to generate the sequence or the information of the one element. In some embodiments, the sequence may include at least one of: a scrambling sequence of a physical downlink channel, and/or a sequence of a signal.

In some embodiments, the X SS resources may be in one time-frequency occasion of SS resources. The X SS resources can be in a same time occasion of SS resources. In certain embodiments, the X SS resources may be in more than one frequency occasion of SS resources. In some embodiments, the X SS resources may be in more than one time occasion of SS resources. In some embodiments, the L PCIs may include a PCI set of $\{PCI=4n+a, n=x*L, x*L+1, \ldots, x*L+L-1\}$. The parameter a can be one value from $\{0, 1, 2, 3\}$. The parameter x may be an integer value equal to or larger than 0. In some embodiments, PRACH resources of each of the L PCIs may be determined according to (or by using) a first signaling (e.g., RRC signaling and/or other types of signaling from the wireless communication node to the wireless communication device). For example, the PRACH resources can be determined according to the signaling and/or a mapping rule between multiple SS resources and the PRACH resources (e.g., as described in Example 1 and/or Example 9). In some embodiments, the X SS resources can be associated/related with one element. If the X SS resources are associated/related with one element, the X SS resources may correspond to the L PCIs and/or one serving cell. The one element may comprise the one serving cell. The L can be smaller than X or equal to X. In some embodiments, PRACH resources of each of the L PCIs may be determined. In some embodiments, PRACH resources may be determined (e.g., by the wireless communication device) according to a PCI of the L PCIs and/or an SS resource index. In some embodiments, the PRACH resources of each of the L PCIs may be determined (e.g., by the wireless communication device) according to a first signaling (e.g., RRC signaling and/or other types of signaling). In some embodiments, PRACH resources of each of the X SS resources may be determined (e.g., by the wireless communication device) by a first signaling (e.g. RRC signaling and/or other types of signaling from the wireless communication node).

pIn some embodiments, the first signaling may comprise a respective PRACH configuration for each of the X SS resources and/or a PRACH configuration for the X SS resources. The first signaling may comprise a first type of PRACH parameter configuration for the X SS resources and/or a second type of PRACH parameter configuration for each of the X SS resources. The first signaling may comprise a respective PRACH configuration for each of the L PCIs, and/or a PRACH configuration for the L PCIs. The first signaling may comprise a first type of PRACH parameter configuration for the L PCIs and/or a second type of PRACH configuration for each of the L PCIs. In some embodiments, the first signaling may be a system information block 1 (SIB1) and/or other system information blocks. In some embodiments, the first signaling may be a single signaling. In some embodiments, the PRACH configuration may comprise a configuration of at least one of: a time resource of PRACH occasions, a frequency resource of PRACH occasions, preambles for one PCI, preambles for one SS resource, a number of preambles for one SS resource, a number of preambles for each of the X SS resources, a number of SS resources associated with one PRACH occasion, a number of SS resources which are in an SS occasion and are associated with one PRACH occasion, and/or a number of PCIs associated with one PRACH occasion. In some embodiments, the first type of PRACH parameter configuration may comprise a configuration of at least one of: a time resource of PRACH occasions, a frequency resource of PRACH occasions, a number of preambles for one SS resource, a number of preambles for each of the X SS resources, and/or a number of SS resources associated with one PRACH occasion. In some embodiments, the second type of PRACH parameter configuration may only include a preamble parameter for each PCI. Therefore, the PRACH occasion of the L PCIs (and/or the X SS resources) can be the same. In some embodiments, only the preamble of the L PCIs (and/or the X SS resources) may be different, as shown in FIG. 17.

In some embodiments, the X SS resources may be associated/related with a same index of SS resource, as shown in FIG. 16. The same index of the SS resource can be a first type of index of the SS resource, as shown in Example 2. In some embodiments, the one element may comprise one common control element. In some embodiments, the information of the one element may comprise at least one of: a bit carried on the one element before a channel code, a scramble sequence added to a CRC of the one element, a scramble sequence added to one or more bits of the one element after the channel code, a sequence of a DMRS of the one element, a QCL-RS of the DMRS of the one element, a RE occupied by the DMRS of the one element, and/or a resource occupied by the one element. In some embodiments, the wireless communication device may perform a cell search and/or a measurement based on the X SS resources. The wireless communication device may receive and/or obtain the one element based on the X SS resources. In some embodiments, performing the cell search may comprise acquiring/establishing/enabling time and frequency synchronization with a physical layer cell and/or detecting/identifying/determining a physical layer cell identifier (ID) of the physical layer cell. In some embodiments, performing the cell search may comprise acquiring/obtaining time and frequency synchronization with a cell group and/or detecting a cell group ID of the cell group. In some embodiments, an SS resource of the X SS resources may comprise a synchronization signal and/or a time-frequency SS occasion. The synchronization signal can be received (e.g., by the wireless communication device) in the time-frequency SS occasion. In some embodiments, the synchronization signal may comprise at least one of: a primary synchronization signal (PSS), a secondary synchronization signal (SSS), and/or other types of synchronization signals.

In some embodiments, at least one PCI may correspond to (or be associated with) the X SS sequences. In some embodiments, the X SS resources may comprise X SS ports. Each of the X SS resources may include at least one SS port. In some embodiments, one PCI may correspond to (or be associated with) the X SS resources and/or the one element. In some embodiments, the X SS resources may be determined according to at least one of: a PCI of at least one of the X SS resources, information of the one element, a carrier frequency of an occasion of the X SS resources, a SCS of the X SS resources, a PCI group, a location of the SS occasion index of a SS resource, and/or a mapping relationship. The location of the SS occasion index can be a time location and/or a frequency location. The mapping relationship can be between multiple SS resources and multiple elements. The PCI group may include at least one of the X SS resources. In some embodiments, the one element may be in the multiple elements. In some embodiments, the one element may comprise at least one of: one PBCH block, a CORESET (e.g., CORESET 0), one SIB, one serving cell, one PCI, one occasion of SS resources, one monitoring occasion of one common control channel, and/or one PRACH configuration. In some embodiments, a second signaling can provide information of a PRACH resource. The second signaling may include and/or specify an index of a reference signal resource associated with the PRACH resource. The second signaling may include and/or specify at least one of following information: a PCI, frequency location of a SS resource, and/or subcarrier spacing of the SS resource. The reference signal resource may comprise the SS resource and/or CSI-RS resource. In some embodiments, the second signaling may include, provide, specify, and/or indicate physical downlink control information. In some embodiments, the CSI-RS resource is quasi co-located (QCL-ed) with the SS resource.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

determining, by a wireless communication device, X synchronization signal (SS) resources, wherein X is a positive integer value greater than 1, wherein the X SS resources are associated with one serving cell, wherein the X SS resources correspond to L physical cell indexes (PCIs), wherein L is an integer value greater than 1, receiving, by the wireless communication device, a first signaling;

determining physical random access channel (PRACH) resources of each of the L PCIs according to the first signaling, wherein the first signaling comprises a respective PRACH configuration for each of the L PCIs; and receiving, by the wireless communication device, physical downlink control information which provides information of a PRACH resource from the PRACH resources of one PCI of the L PCIs, wherein the information includes an index of a SS resource associated with the PRACH resource, and the one PCI, wherein the SS resource is from the X SS resources.

2. The method of claim 1, wherein at least one of:

the first signaling is a system information block 1 (SIB1);

the first signaling is a single signaling; or the first signaling is a RRC signaling.

3. The method of claim 1, wherein the PRACH configuration comprises a configuration of at least one of: time resource of PRACH occasions, frequency resource of PRACH occasions, preambles for one PCI, preambles for one SS resource, number of preambles for one SS resource, number of SS resources associated with one PRACH occasion, or number of SS resources which are in an SS occasion and are associated with one PRACH occasion.

4. The method of claim 1, comprising:

determining, by the wireless communication device, the PRACH resource according to the index of the SS resource associated with the PRACH resource, the one PCI, and a mapping between PRACH resources and a combination of an SS resource index and an index of the one PCI.

5. The method of claim 1, further comprising:

transmitting, by the wireless communication device, a first preamble of PRACH on the PRACH resource from the PRACH resources of the one PCI of the L PCIs, wherein each of the PRACH resources include a PRACH occasion and a second preamble, and wherein the PRACH occasion includes at least one of time resource and frequency resource for transmitting the second preamble by the wireless communication device.

6. A method comprising:

determining, by a wireless communication node, X synchronization signal (SS) resources, wherein X is a positive integer value greater than 1;

wherein the X SS resources are associated with one serving cell, wherein the X SS resources correspond to L physical cell indexes (PCIs), wherein L is an integer value greater than 1, transmitting, by the wireless communication node, a first signaling, wherein physical random access channel (PRACH) resources of each of the L PCIs are determined according to the first signaling, wherein the first signaling comprises a respective PRACH configuration for each of the L PCIs; and transmitting, by the wireless communication node, physical downlink control information which provides information of a PRACH resource from the PRACH resources of one PCI of the L PCIs, wherein the information includes an index of a SS resource associated with the PRACH resource, and the one PCI, wherein the SS resource is from the X SS resources.

7. The method of claim 6, wherein at least one of:

the first signaling is a system information block 1 (SIB1);

the first signaling is a single signaling; or the first signaling is a RRC signaling.

8. The method of claim 6, wherein the PRACH configuration comprises a configuration of at least one of: time resource of PRACH occasions, frequency resource of PRACH occasions, preambles for one PCI, preambles for one SS resource, number of preambles for one SS resource, number of SS resources associated with one PRACH occasion, or number of SS resources which are in an SS occasion and are associated with one PRACH occasion.

9. The method of claim 6, comprising:

determining, by the wireless communication node, the PRACH resource according to the index of the SS resource associated with the PRACH resource, the one PCI, and a mapping between PRACH resources and a combination of an SS resource index and an index of the one PCI.

10. The method of claim 6, further comprising:

receiving, by the wireless communication node from a wireless communication device, a first preamble of PRACH on the PRACH resource from the PRACH resources of the one PCI of the L PCIs, wherein each of the PRACH resources include a PRACH occasion and a second preamble, and wherein the PRACH occasion includes at least one of time resource and frequency resource for transmitting the second preamble by the wireless communication device.

11. A wireless communication device, comprising:

at least one processor configured to:

determine X synchronization signal (SS) resources, wherein X is a positive integer value greater than 1;

wherein the X SS resources are associated with one serving cell, wherein the X SS resources correspond to L physical cell indexes (PCIs), wherein L is an integer value greater than 1, receive a first signaling;

determine physical random access channel (PRACH) resources of each of the L PCIs according to the first signaling, wherein the first signaling comprises a respective PRACH configuration for each of the L PCIs; and receive physical downlink control information which provides information of a PRACH resource from the PRACH resources of one PCI of the L PCIs, wherein the information includes an index of a SS resource associated with the PRACH resource, and the one PCI, wherein the SS resource is from the X SS resources.

12. The wireless communication device of claim 11, wherein at least one of:

the first signaling is a system information block 1 (SIB1);

the first signaling is a single signaling; or the first signaling is a RRC signaling.

13. The wireless communication device of claim 11, wherein the PRACH configuration comprises a configuration of at least one of: time resource of PRACH occasions, frequency resource of PRACH occasions, preambles for one PCI, preambles for one SS resource, number of preambles for one SS resource, number of SS resources associated with one PRACH occasion, or number of SS resources which are in an SS occasion and are associated with one PRACH occasion.

14. The wireless communication device of claim 11, wherein the PRACH resource is determined according to the index of the SS resource associated with the PRACH resource, the one PCI, and a mapping between PRACH resources and a combination of an SS resource index and an index of the PCI.

15. The wireless communication device of claim 11, the at least one processor further configured to:

transmit, by the wireless communication device, a first preamble of PRACH on the PRACH resource from the PRACH resources of the one PCI of the L PCIs, wherein each of the PRACH resources include a PRACH occasion and a second preamble, and wherein the PRACH occasion includes at least one of time resource and frequency resource for transmitting the second preamble by the wireless communication device.

16. A wireless communication node, comprising:

at least one processor configured to:

determine X synchronization signal (SS) resources, wherein X is a positive integer value greater than 1;

wherein the X SS resources are associated with one serving cell, wherein the X SS resources correspond to L physical cell indexes (PCIs), wherein L is an integer value greater than 1, transmit, via a transmitter, a first signaling, wherein physical random access channel (PRACH) resources of each of the L PCIs are determined according to the first signaling; and transmit, via the transmitter, physical downlink control information which provides information of a PRACH resource from the PRACH resources of one PCI of the L PCIs, wherein the information includes an index of a SS resource associated with the PRACH resource, and the one PCI, wherein the SS resource is from the X SS resources.

17. The wireless communication node of claim 16, wherein at least one of:

the first signaling is a system information block 1 (SIB1);

the first signaling is a single signaling; or the first signaling is a RRC signaling.

18. The wireless communication node of claim 16, wherein the PRACH configuration comprises a configuration of at least one of: time resource of PRACH occasions, frequency resource of PRACH occasions, preambles for one PCI, preambles for one SS resource, number of preambles for one SS resource, or number of SS resources associated with one PRACH occasion, or number of SS resources which are in an SS occasion and are associated with one PRACH occasion.

19. The wireless communication node of claim 16, wherein the PRACH resource is determined according to the index of the SS resource associated with the PRACH resource, the one PCI, and a mapping between PRACH resources and a combination of an SS resource index and an index of the one PCI.

20. The wireless communication node of claim 16, the at least one processor further configured to:

receiving, by the wireless communication node from a wireless communication device, a first preamble of PRACH on the PRACH resource from the PRACH resources of the one PCI of the L PCIs, wherein each of the PRACH resources include a PRACH occasion and a second preamble, and wherein the PRACH occasion include at least one of time resource and frequency resource for transmitting the second preamble by the wireless communication device.

* * * * *